(12) United States Patent
Bilge

(10) Patent No.: US 11,499,319 B2
(45) Date of Patent: Nov. 15, 2022

(54) UNIVERSAL Z-Z CHANNEL FOR MOUNTING WALL PANELS TO EXISTING WALL

(71) Applicant: Henry H. Bilge, Fort Lee, NJ (US)

(72) Inventor: Henry H. Bilge, Fort Lee, NJ (US)

(*) Notice: Subject to any disclaimer, the term of this patent is extended or adjusted under 35 U.S.C. 154(b) by 0 days.

(21) Appl. No.: 17/180,859

(22) Filed: Feb. 21, 2021

(65) Prior Publication Data

US 2022/0145643 A1 May 12, 2022

Related U.S. Application Data

(63) Continuation-in-part of application No. 17/091,255, filed on Nov. 6, 2020, now abandoned.

(51) Int. Cl.
*E04F 13/08* (2006.01)
*E04B 1/76* (2006.01)

(52) U.S. Cl.
CPC .......... *E04F 13/0875* (2013.01); *E04B 1/762* (2013.01); *E04F 13/0803* (2013.01)

(58) Field of Classification Search
CPC .. E04F 13/0803; E04F 13/0875; E04B 1/7629
See application file for complete search history.

(56) References Cited

U.S. PATENT DOCUMENTS

| 9,151,052 B2 * | 10/2015 | Krause | E04F 13/0828 |
| 9,200,455 B2 * | 12/2015 | Preston | E04F 13/0803 |
| 9,896,849 B1 * | 2/2018 | Aboukhalil | E04F 13/0803 |

* cited by examiner

*Primary Examiner* — Patrick J Maestri
(74) *Attorney, Agent, or Firm* — Joshua Kaplan, Esq; Kaplan Law Practice LLC

(57) ABSTRACT

Disclosed is a system of cladding along an existing exterior wall of a building featuring a plurality of Z-shaped components deployed in a parallel spaced apart arrangement, with an insulation panel in between two of the Z-shaped components. The Z-shaped components having a J-wall to enforce a moisture gap between exterior wall paneling and insulation. The Z-shaped components may feature Edge-components when the line of insulation panels needs to be interrupted or when it reaches a corner or edge of a wall.

20 Claims, 35 Drawing Sheets

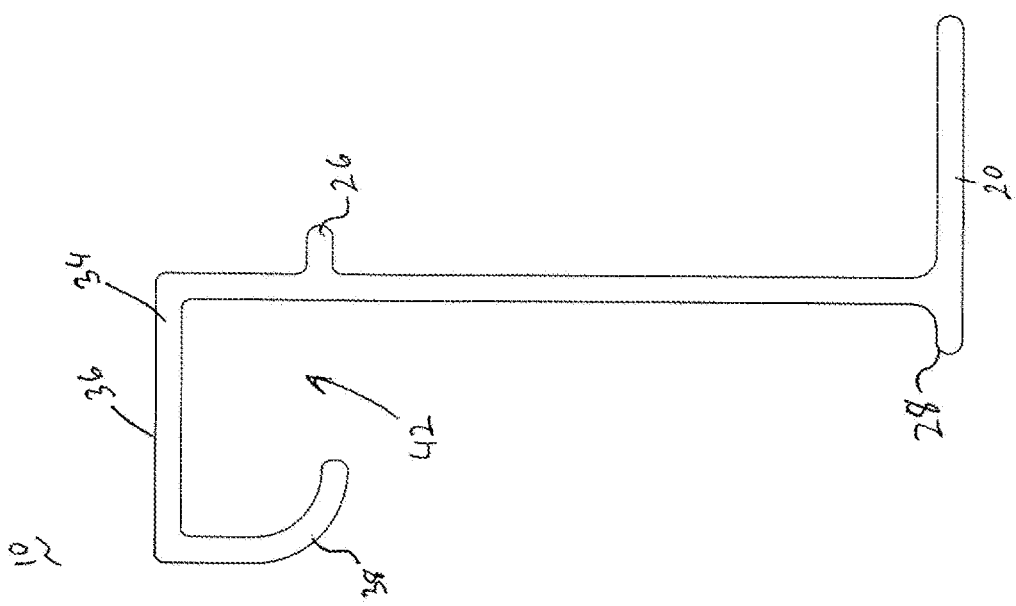

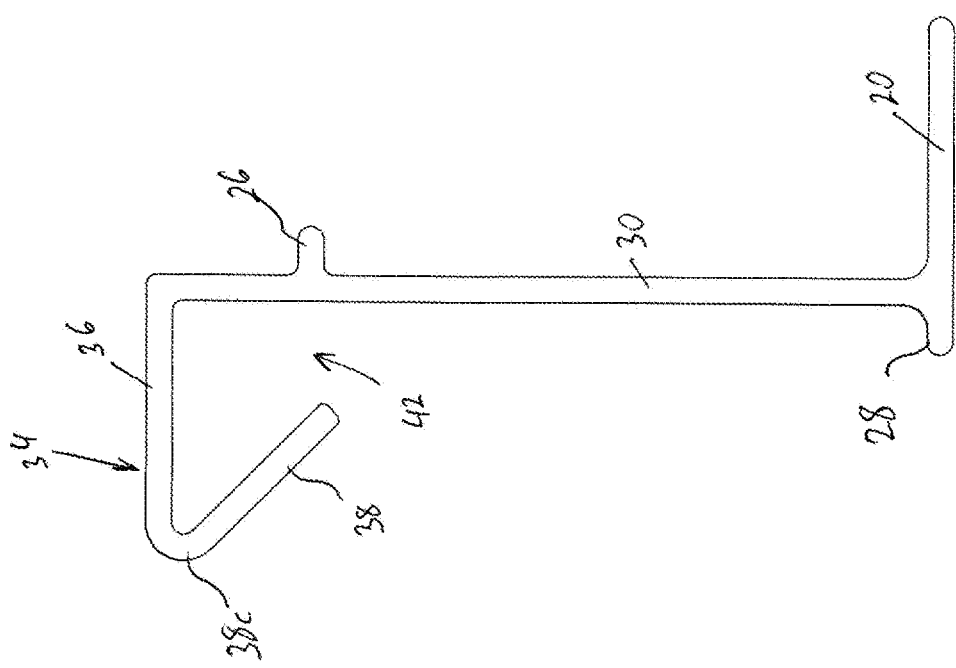

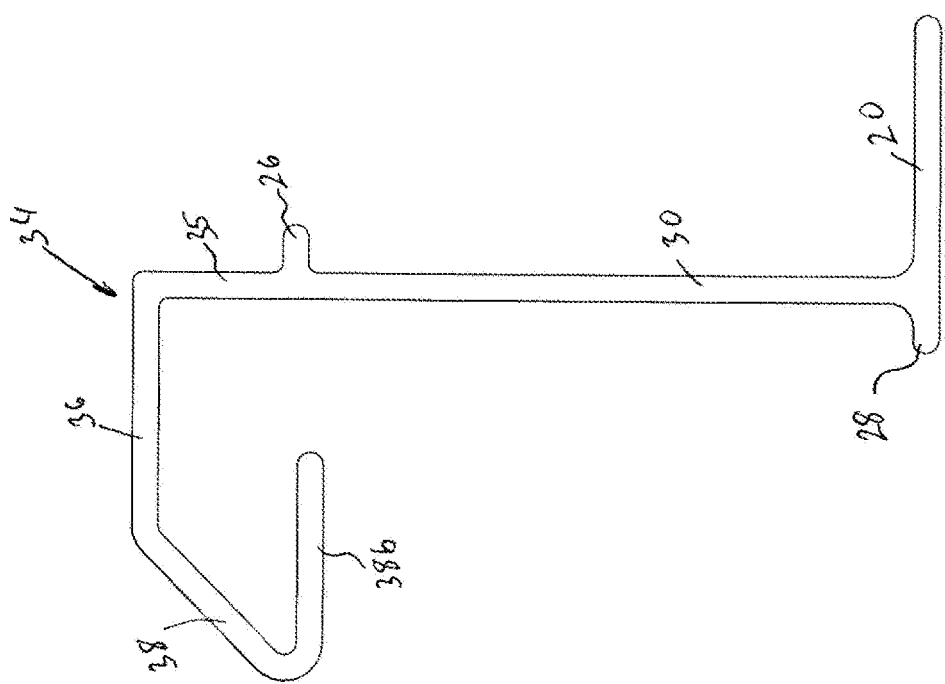

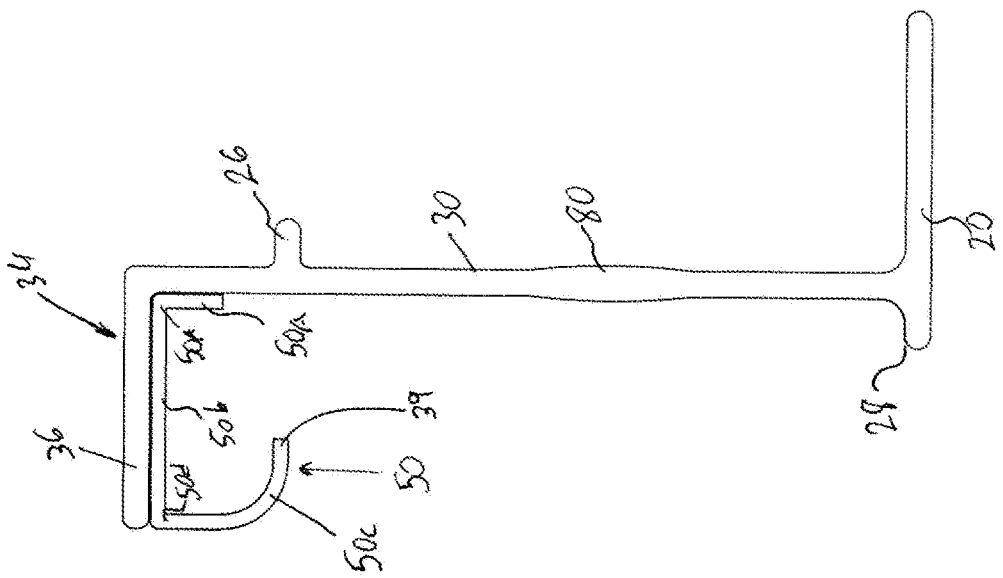

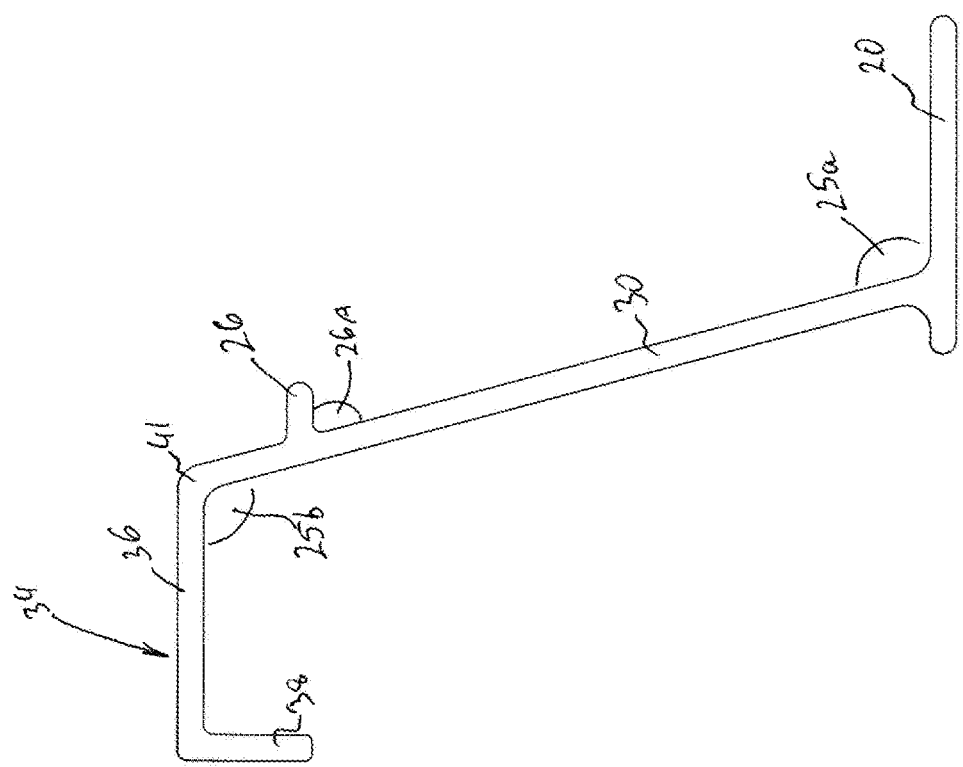

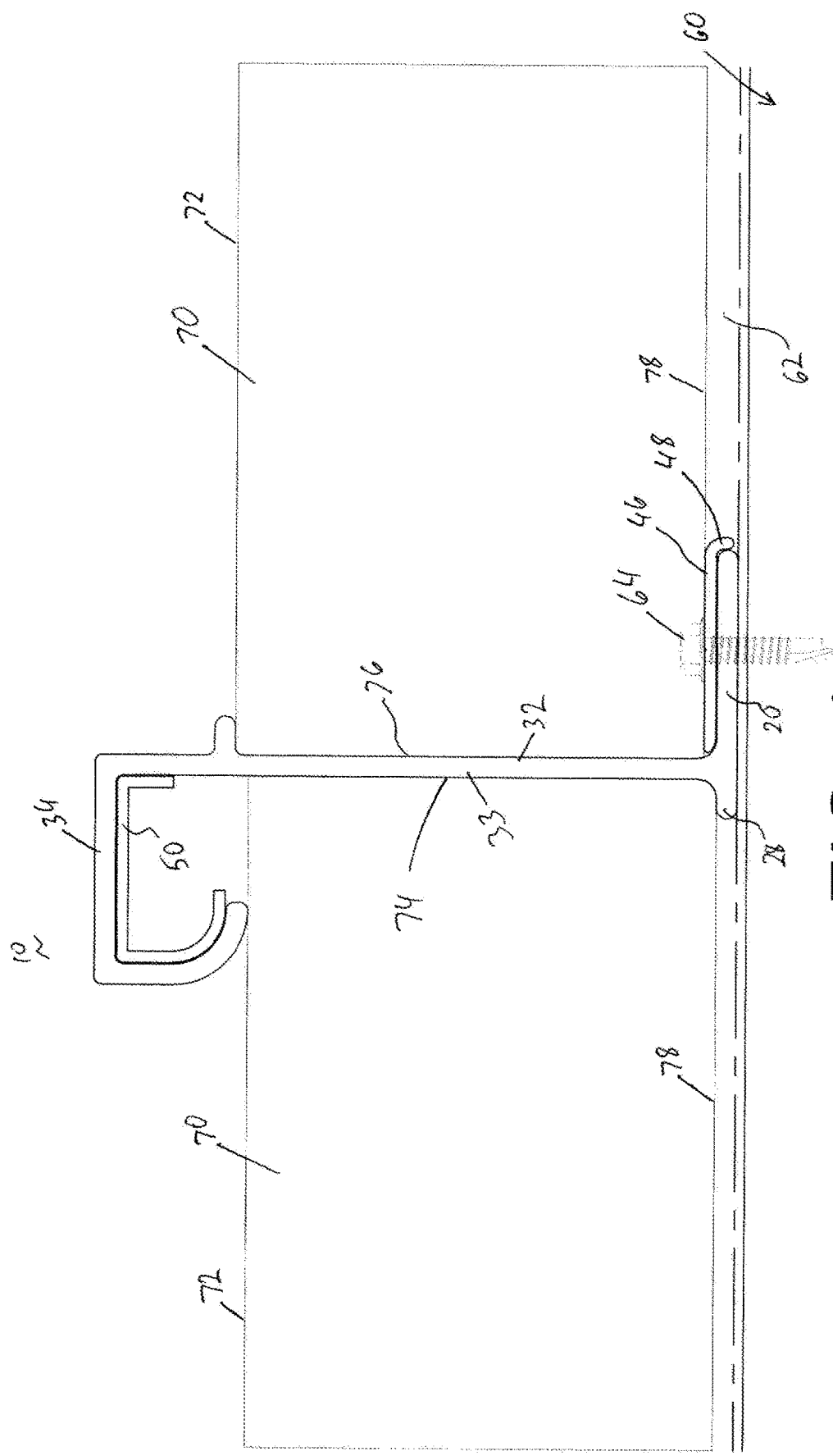

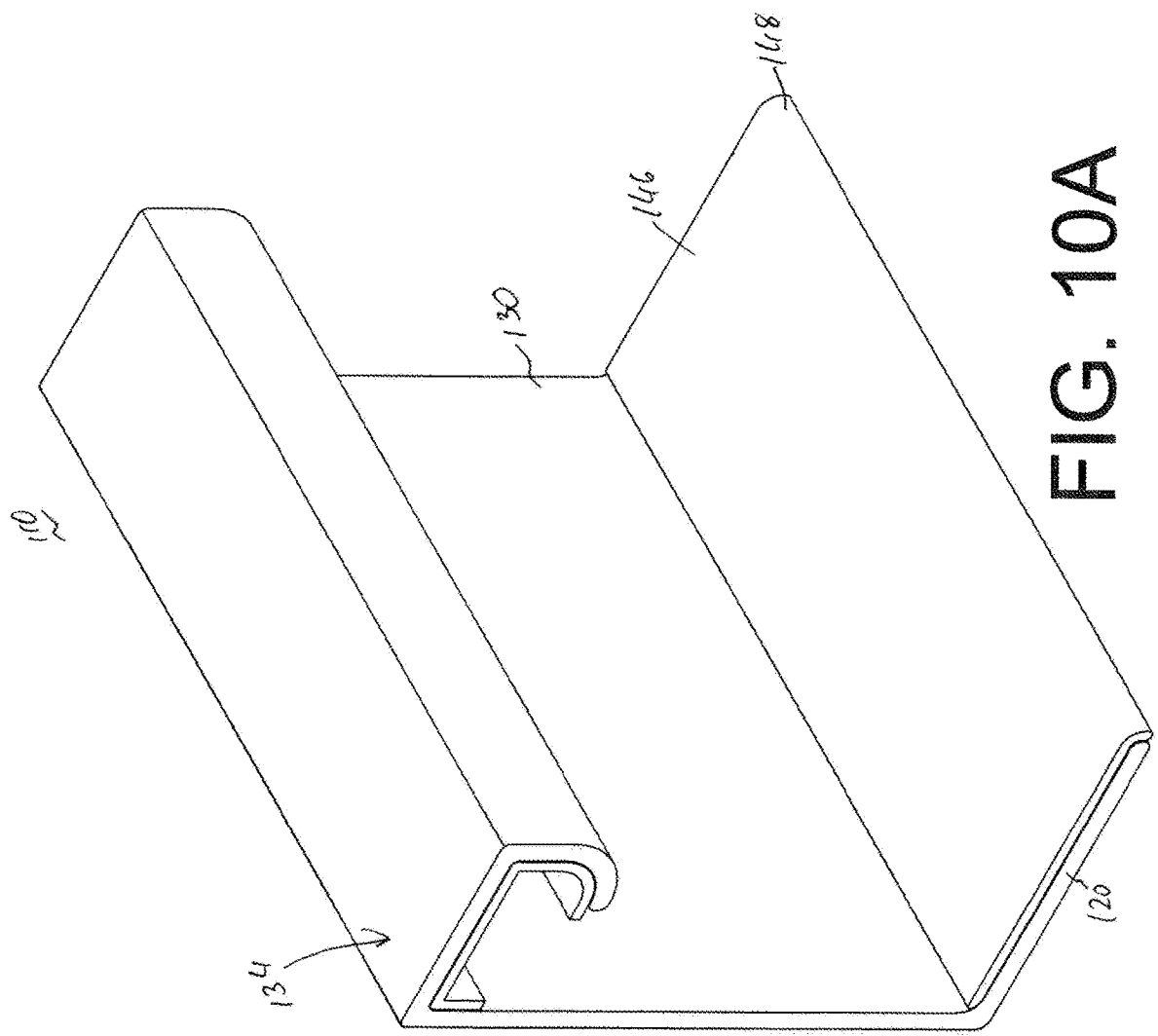

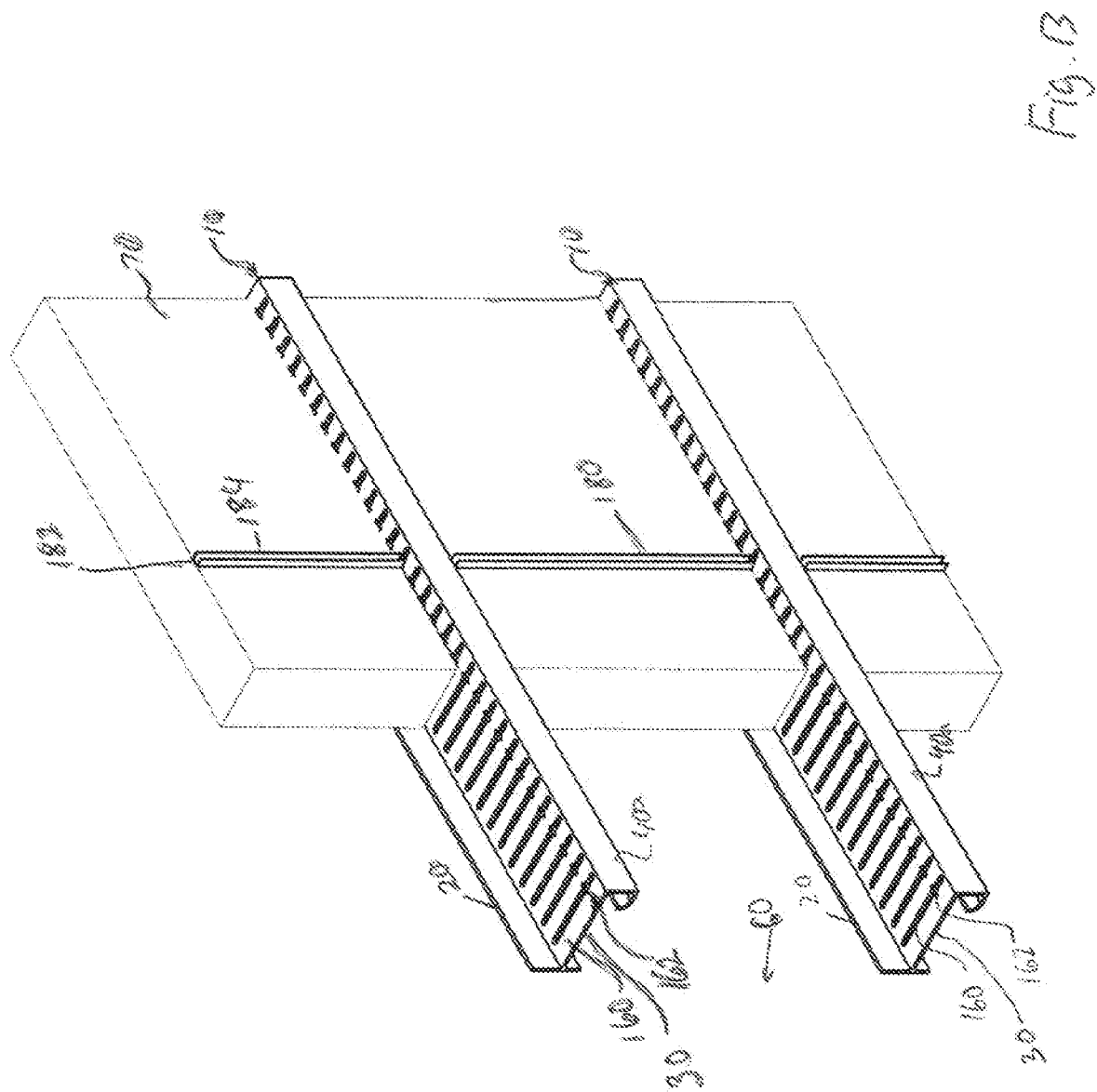

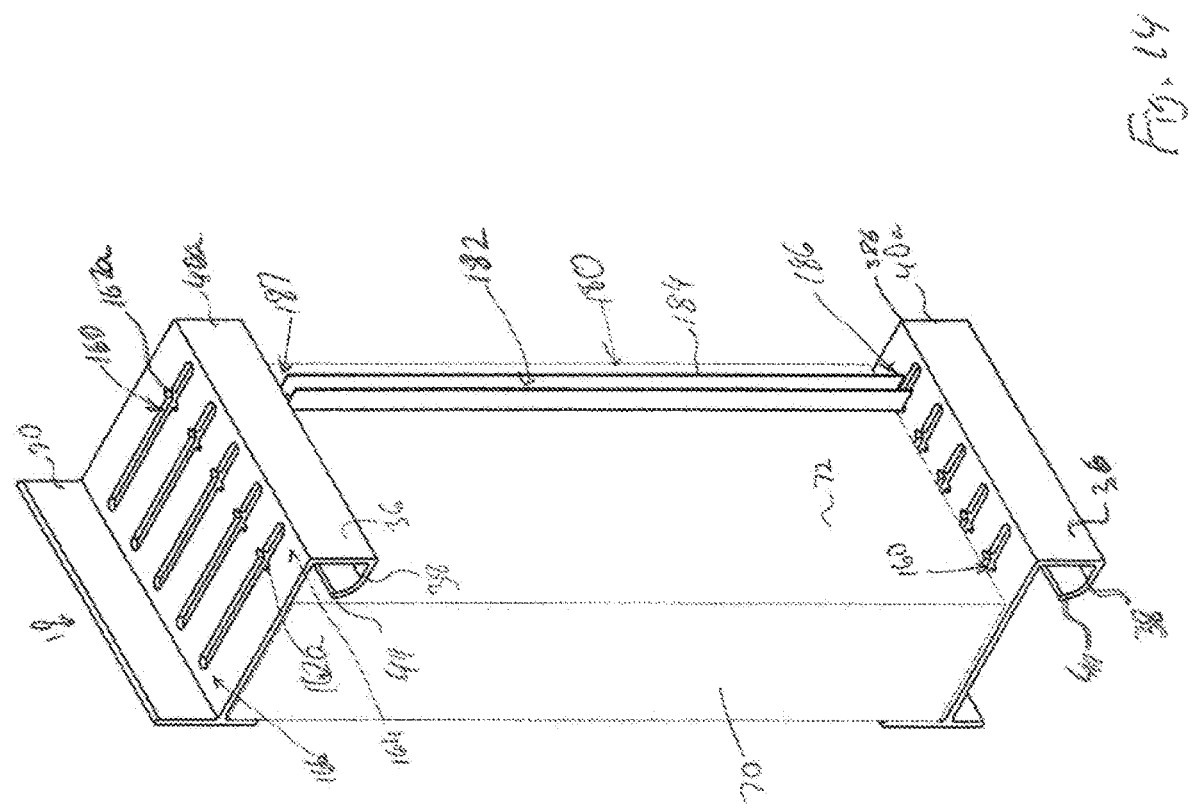

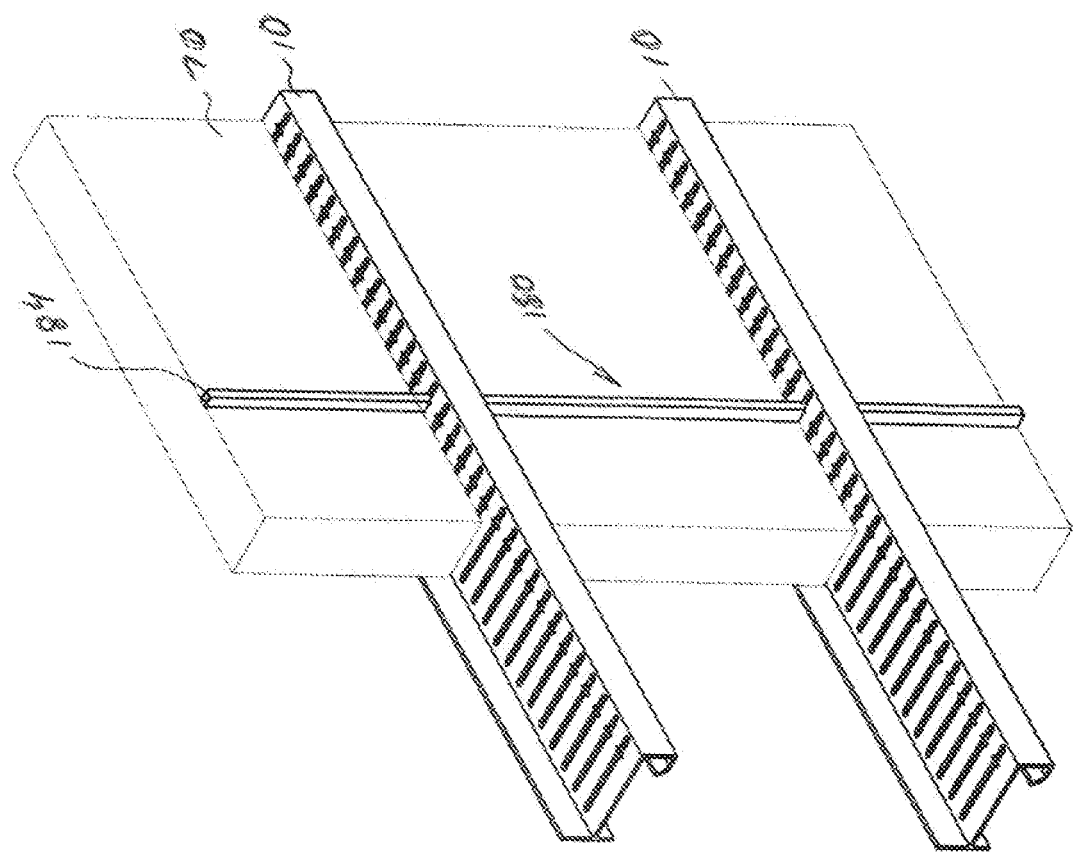

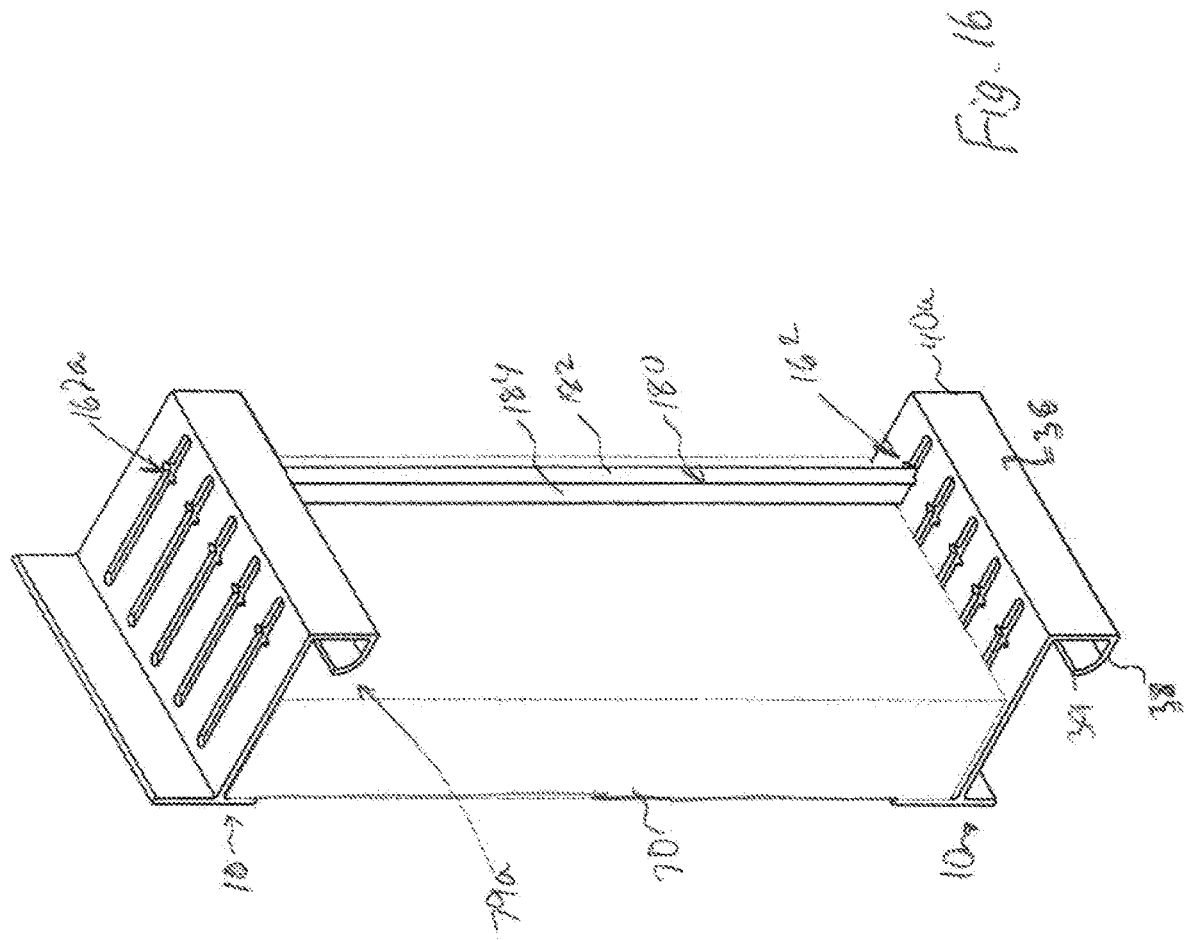

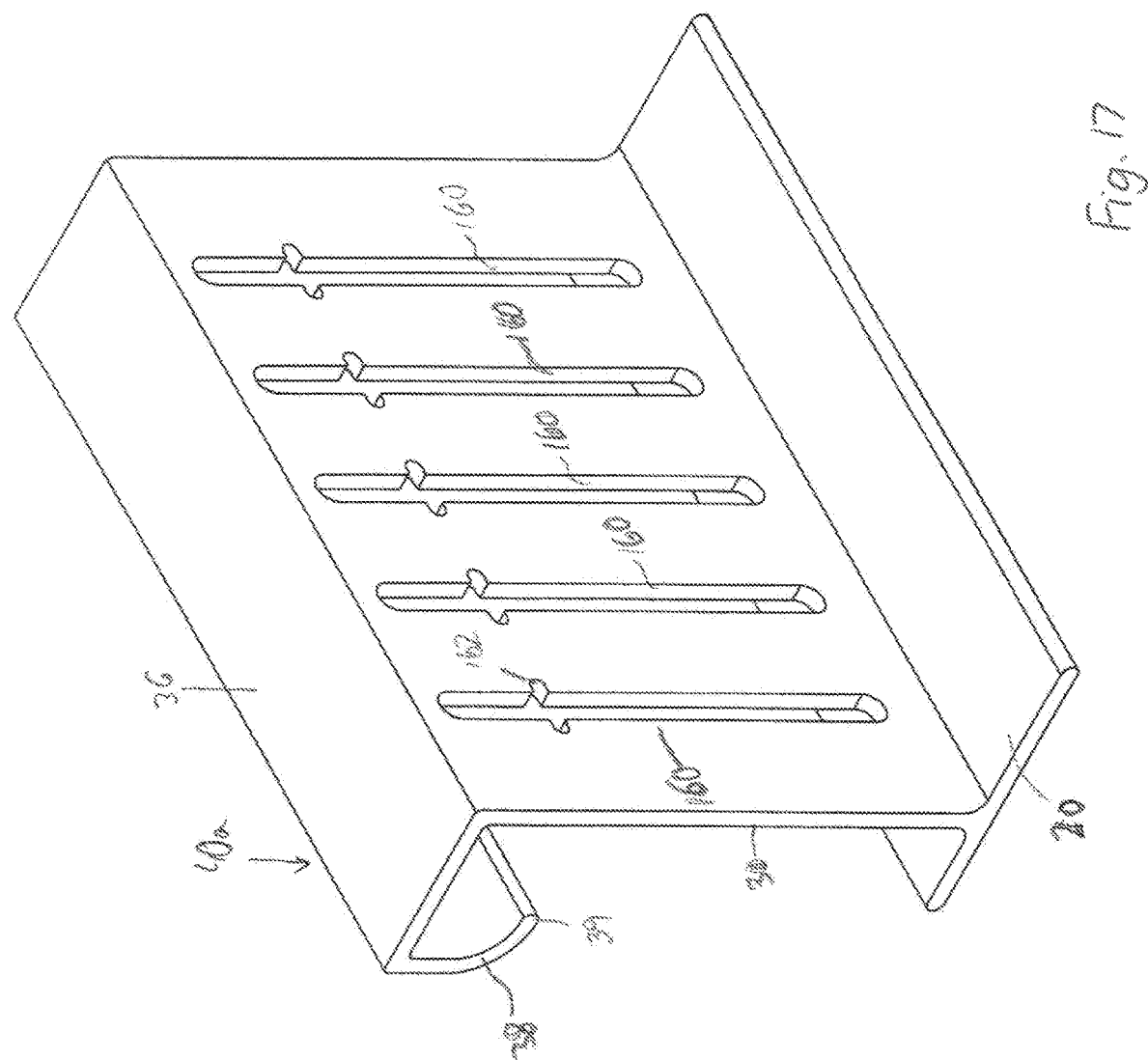

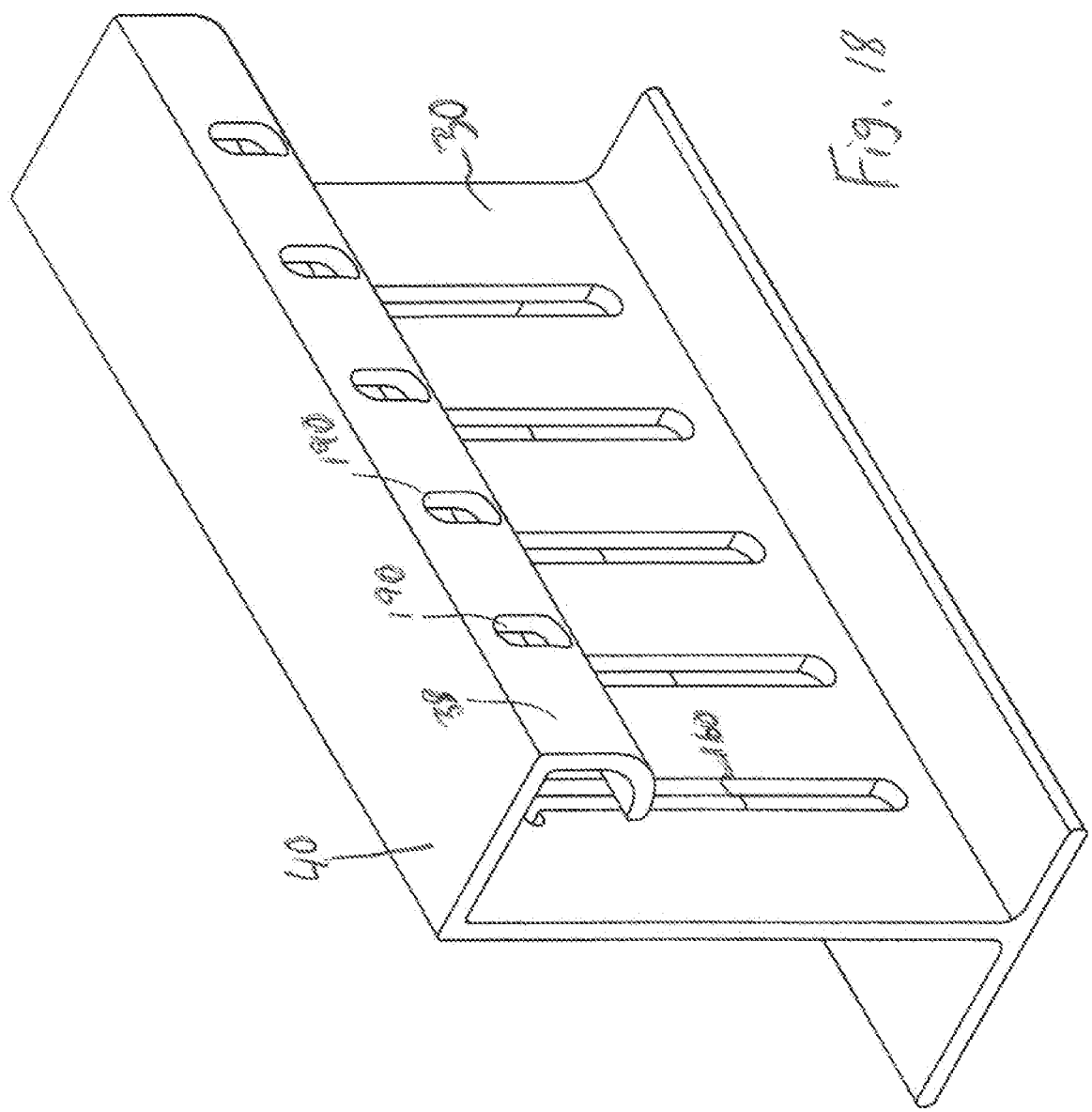

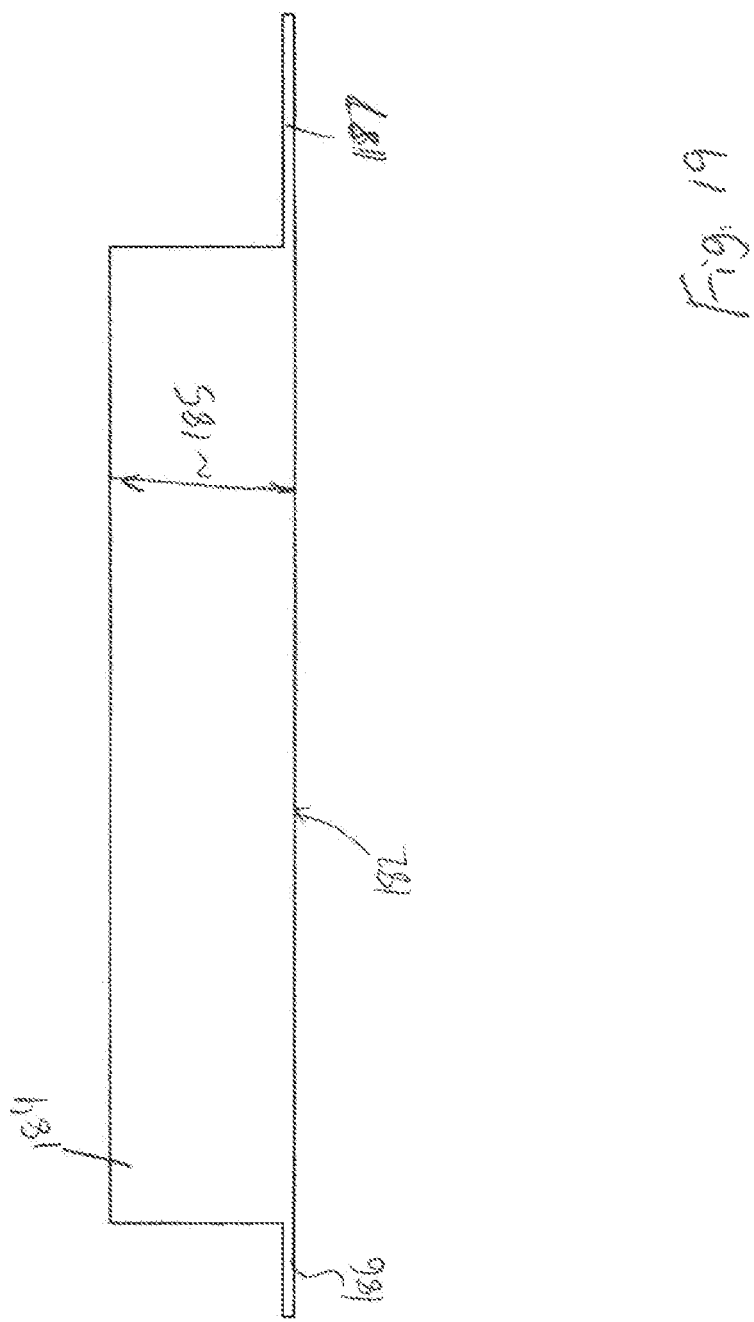

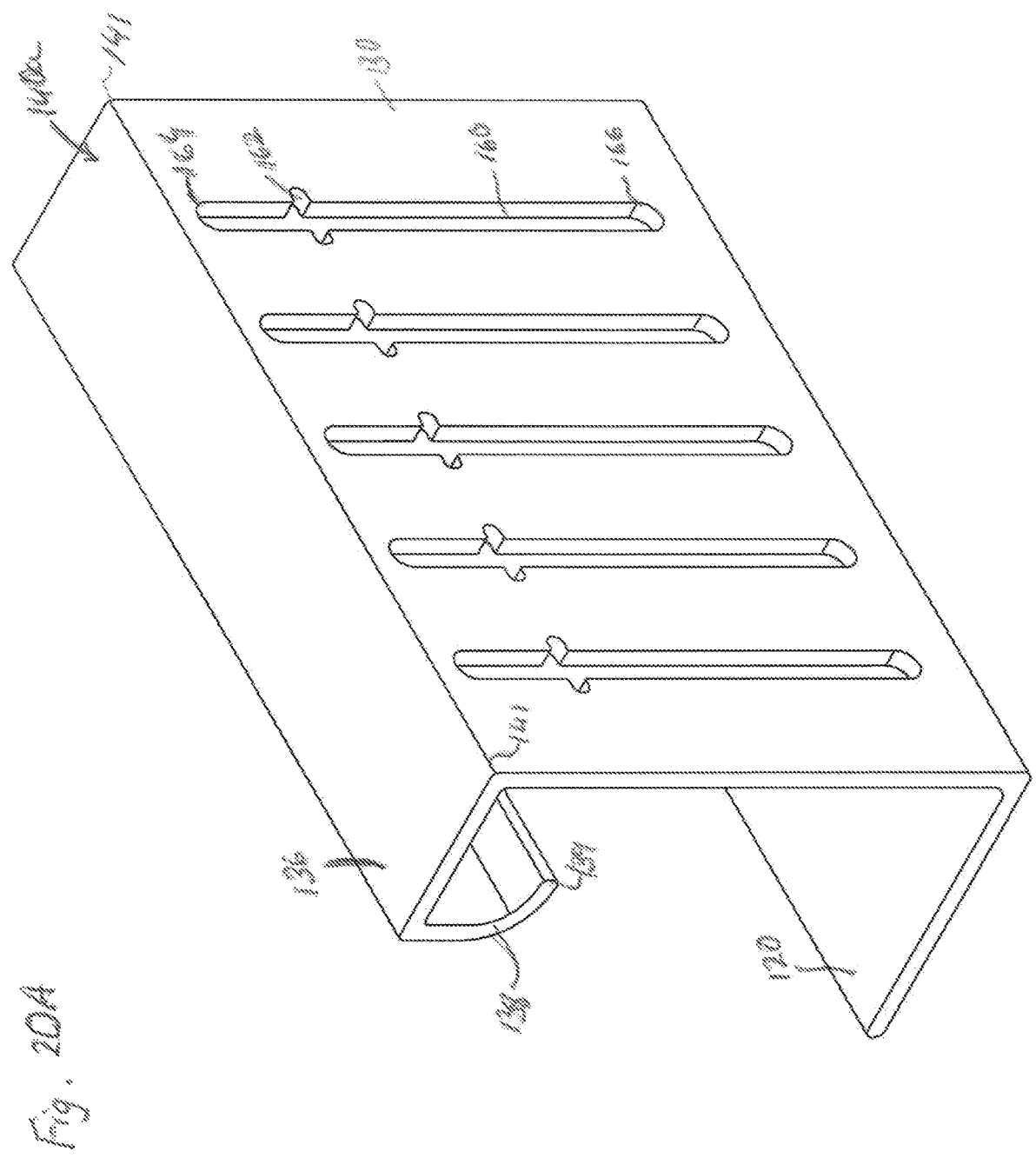

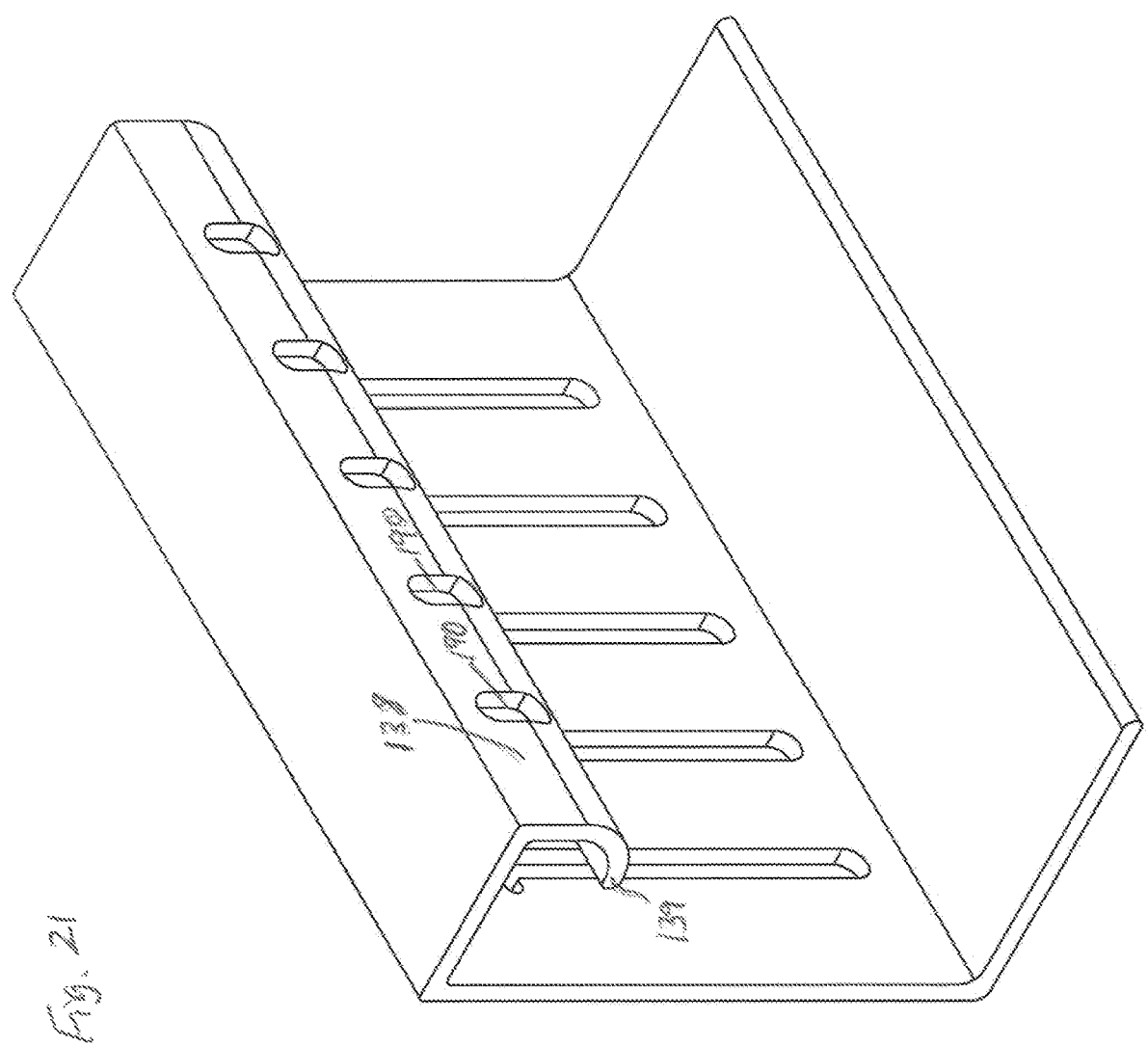

UNIVERSAL Z-Z CHANNEL FOR MOUNTING WALL PANELS TO EXISTING WALL

REFERENCE TO RELATED APPLICATION

The present application is a Continuation-in-Part of U.S. patent application Ser. No. 17/091,255 filed on Nov. 6, 2020 to the same inventor herein, and entitled UNIVERSAL Z-Z CHANNEL FOR MOUNTING WALL PANELS TO EXISTING WALL, the entire disclosure of which is incorporated herein by reference.

BACKGROUND OF THE INVENTION

The present invention relates generally to a wall system, and more particularly, to a system for easily mounting wall panels over an existing wall while concealing exterior insulation.

Exterior decorative works of an existing wall are exposed to elements, in particular, to moisture. Although caulking and other gap remediation techniques abound and are well known, moisture may still penetrate. Despite moisture penetration, good airflow will wick away water before mold and other destructive consequences set in. For this reason, sound construction practices, and in some instances, building code, require that exterior panels are separated from insulation by a gap of approximately 2.5 centimeters.

This gap is also highly desirable to promote conservation of energy inside building structures. Due to the principal of conduction, even insulation will transfer hot or cold onto a surface it is insulating and thus eventually loose some of its effectiveness. To overcome the loss of insulating efficiency caused by conduction, sound construction practices recommend creating an air gap between an exterior layer of exterior insulation and the layer of exterior wall paneling. This air gap creates a reflective barrier, where the hot or cold air radiating from the exterior wall panel is reflected by the insulation layer due to the presence of the air gap.

Enforcement of the air gap between the insulation layer and the exterior wall paneling is a known practice that is often dictated by the building code. However, there is presently no standard and failsafe compliance method. Instead, contractors attempt to comply by inserting a separate strip of material between the exterior paneling and the insulation. Existing methods have several serious shortcomings. The first one is higher cost and length of installation. The cost is increased due to the requirement of purchasing, stocking and components required in ensuring that a gap is present. Secondly, installation requires a separate step involving a non-standard component. Third, it is often difficult to keep the thickness of the air gap uniform when utilizing non-standard and disparate components. Finally, the presence of an additional structural component adds to the complexity of a project and increases the risk of mistake or accident occurring due to the additional level of complexity.

Furthermore, just the presence of a gap may not be sufficient in some situations. For example, certain facades will permit a small amount of water to trickle through and behind wall cladding. This moisture needs to have a drainage outlet and must be completely ventilated to discourage accumulation of damaging moisture, mold, or mildew. Existing solutions do not adequately address the problems identified above.

It is therefore desirable to provide a system that creates a single structural component which form a frame for attaching exterior insulation to an existing wall, which also serves as a point of attachment of exterior paneling, and which enforces a uniform air gap between the exterior paneling and the layer of insulation.

SUMMARY OF THE INVENTION

It is an object of the present invention to provide for a simple and uniform means of ensuring that an air gap exists between an exterior or cladding covering and a layer of exterior insulation.

It is another object of the present invention to provide a sustainable and adequate airflow between cladding panels and insulation, which among other benefits, prevents unchecked moisture buildup.

It is still another object of the present invention to provide a first moisture gap that is enforceable by the shape of the Z-girt or Z-shaped component holding the insulation panels and exterior wall panels It is still another object of the present invention to provide a wide first moisture gap above the insulation panels and below the cladding panels, and a second moisture gap between the insulation panels and an existing wall of the structure.

It is still another object of the present invention to provide way of retaining insulation panels between two neighboring Z-shaped components by use of a rod spanning the two Z-shaped components.

It is still another object of the present invention to enable the use of insulation panels of varying thickness, where the panels are nonetheless securely retained between the Z-shaped components through use of rods of various thicknesses or diameters.

Therefore, in accordance with the present invention, a system for ensuring that exterior insulation is installed at a desired distance from shell or cladding panels, includes a plurality of Z-shaped components. The plurality of Z-shaped components attaching in a parallel and spaced apart association with each other along an existing wall, Each Z-shaped component is made of a first wall, a second wall and a J-shaped third wall. The first wall having a first end and a second end is. The first wall being preferably parallel to an existing wall and is mounted either vertically, horizontally, or diagonally thereon.

The second wall extends forwardly at an angle, preferably a right angle, from the first wall. The free end of the second wall contains the J-shaped wall. The J-shaped wall is made of two portions. The first portions is parallel to the first wall but extends in the opposite direction from the first wall. The second portion extends rearwardly from the free end of the first portion, with a free end of the second portion being located at a distance above the first wall. The first portion of the J-shaped wall is configured to accept an exterior or cladding paneling bolted thereto.

The J-shaped wall extends for the entire length of the Z-shaped component and forms a hollow channel that is open on one side, namely between the free end of the second, portion and the second wall. In an alternative embodiment an insert is configured to serve as a strength element and to receive the mounting bolts. The strength element is inserted into the hollow channel formed by the J-shaped portion. Additional durability cladding may in the form of a protective bracket placed on the surface of the first wall and which may include a front lip to further shield the first wall. The protective bracket configured to receiving the fastening bolt.

In another embodiment, the second wall of the Z-shaped component also comprises an upper lip. The protruding upper lip extending obliquely and at an angle, preferably a right angle, to the first side of the second wall. The upper lip is set off from the free end of the first side and is co-planar to the free end of the second portion. In an embodiment in which the second wall is not oriented perpendicularly to the first wall, the upper lip will preferably be disposed parallel to the first wall, which would translate to an acute or obtuse angle with respect to the second wall.

In another embodiment the second wall of the Z-shaped component contains a flared section along its height. The concave section may exist throughout the length of the second wall and appear on both or one of the first and second sides of the second wall. The flared section is intended to burrow in the first end of an insulation panel adjacent to the second side and the second end of the next insulation panel that is adjacent to the first side, to induce a greater moisture seal between the adjacent components. The next insulation panel's first end will similarly be encased against a flared protrusion of the second side of the next Z-shaped component.

An edge component is disclosed. The edge, component being in a spaced apart parallel relation to at least one Z-shaped component in the plurality of Z-shaped components deployed in parallel to each other along an existing wall. The edge component terminating a section of insulating panels. An edge component is comprised of a first wall, a second wall extending forwardly at an angle, preferably a right angle, from the first wall, and an J-shaped wall on the free end of the second wall extending in the same direction as the first wall in a parallel and spaced apart configuration with the first wall. The J-shaped wall of the edge component formed from first portion and second portion. The first portion being parallel to the first wall and configured to accept an external or cladding panel bolted to the exterior surface of the first portion. The second portion extending rearwardly from the free end of the fist portion and having a free end that terminates at a distance above the first wall. The free end of the second portion on the edge component being co-planar with the free end of the second portion of a contiguous Z-shaped component. Meaning that the free ends of the second portion being at the same distance relative to the first wall of their respective first walls. The free end of either the Z-shaped component or the edge component forming and enforcing the desired air gap between the exterior surface of an insulation panel and the bottom surface of an exterior panel.

The J-shaped wall of the edge component forms a hollow channel that is open on one side, namely the side between the free end of the second component and the second wall. An insert forming a strength element is disclosed for the hollow channel of the edge component. This insert being interchangeable with the insert for any of the other Z-shaped components. The insert may be placed into the hollow channel by inserting it into the opening on the either side of the hollow channel or by wedging the insert, into the open side of the hollow channel.

In another embodiment of the disclosed system of supporting wall cladding presents Z-shaped components having a plurality of openings to allow air to move freely between Z-shaped components. Preferably this means that each second wall further comprises a plurality of elongated air gaps and the second portion of the J-shaped all also comprises air openings.

BRIEF DESCRIPTION OF THE DRAWINGS

FIG. 3 is a side elevational view of a Z-shaped component.

FIG. 3A-3H demonstrating various different shapes of the second portion of the J-shaped wall of either the Z-shaped component or the Edge component.

FIG. 4 is another sideview of the Z-shaped component showing insulation panels installed adjacently to first and second sides of the second wall.

FIGS. 10 and 10A are perspective views of the edge component, with FIG. 10 having the flared section along the second wall.

FIG. 13 demonstrates an alternative embodiment of Z-shaped components with an insulation panel installed therebetween and secured with intersecting rods.

FIG. 14 is a closer view of the embodiment shown in FIG. 13.

FIG. 15 demonstrates an alternative embodiment of Z-shaped components with an insulation panel installed therebetween and secured with intersecting rods.

FIG. 16 is a closer view of the embodiment shown in FIG. 14.

FIG. 17 is a perpendicular view of the alternative embodiment of the Z-shaped component shown in FIG. 13.

FIG. 18 is another perpendicular view of the alternative embodiment of the Z-shaped component shown in FIG. 13, shown from another angle.

FIGS. 19 and 20 are embodiments of a rod for retaining insulation panels between two adjacent Z-shaped components.

FIGS. 20A and 21 are, detailed diagrams of an alternative embodiment of the edge component having a plurality of air slots and air openings.

DESCRIPTION OF THE PREFERRED EMBODIMENTS

Figure 1:
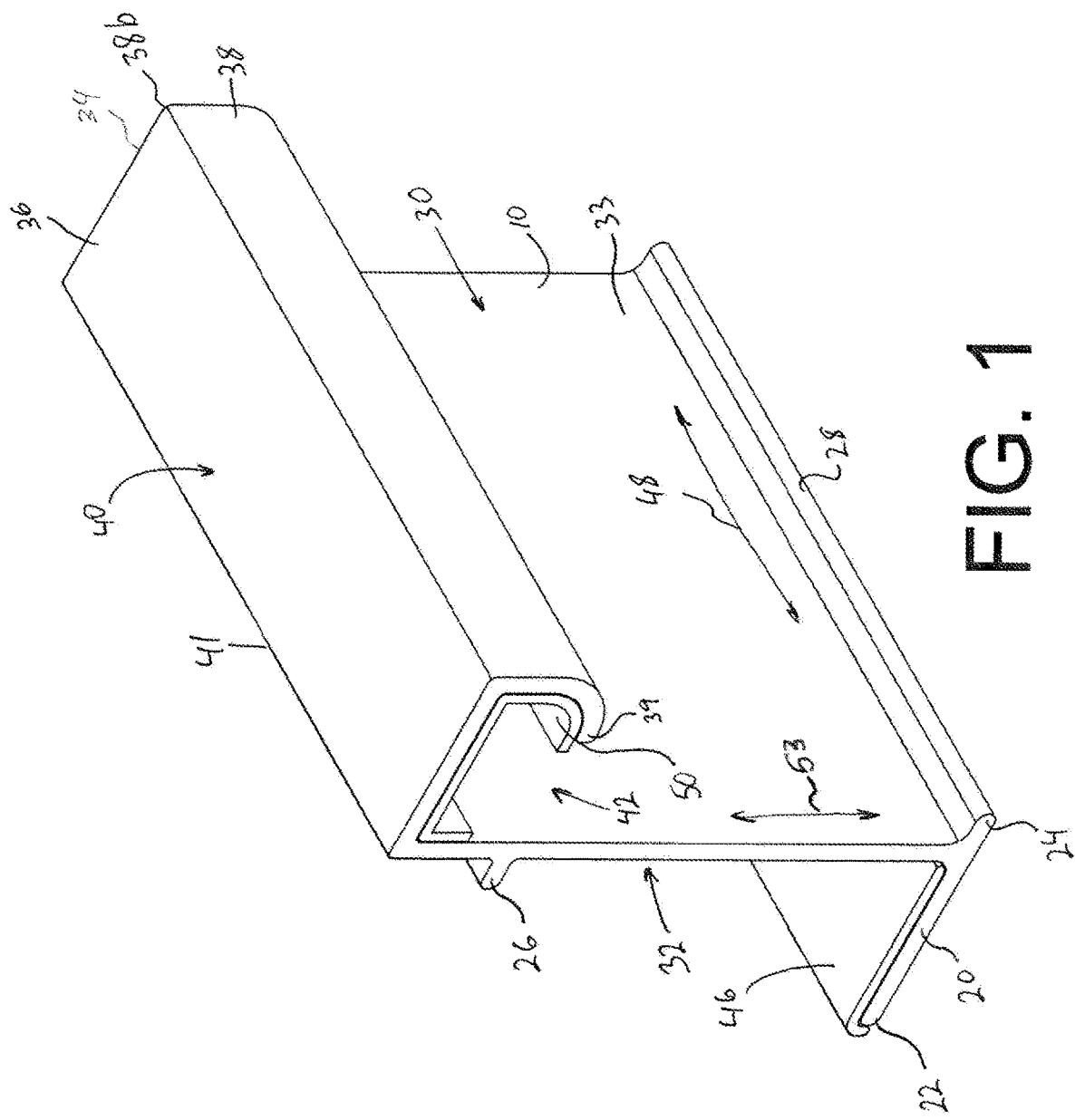
FIG. 1 is a perspective view of the preferred embodiment of the Z-shaped component.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can, be made thereto.

Turning now descriptively to the drawings, shown in FIG. 1 is one embodiment of the Z-shaped component 10, having a first wall 20, the second wall 30 and the J-shaped wall 34. The first wall 20, having the first end 22 and the second end 24. The second wall 30 extends forwardly, at an angle, preferably a right angle, from the second end 24, or slightly offset from the second end 24, of the first wall 20. In the embodiment shown in FIG. 1, the second wall 20 is set off from the second end 24, and this set off creating a lower lip 28 that is coplanar with the rest of the first wall 20. The set off creating the lower lip 28 is preferably uniform for the entire length 48.

The free end 41 contains the J-shaped wall 34. The J-shaped wall 34 is further comprised of the first portion 36, which is substantially plane and in parallel orientation with the lower lip 28 of the first wall 20 but extends in the direction opposite to the first wall 20. The first portion 36 contains an outer surface 40, which as will be demonstrated in figures below, is configured to accept exterior wall panels 90. The second portion 38 extends rearwardly from the free end 38b of the first portion 36. Approximately halfway down along the height of the second portion 38, the second portion 38 bends towards the fir side 33, with the free end 39 terminating at a distance from the second side. The structure of the J-shaped wall 34 creates a hollow channel 42, which may admit an insert 55.

While only one Z-shaped component 10 is shown in FIG. 1, preferably a plurality of Z-shaped components 10 are fastened to the exterior surface of an existing wall, in a parallel spaced apart orientation to each other, with an insulation panel 72 (FIG. 5) fitting between each two parallel Z-shaped components. The length 48 of the Z-shaped component 10 is variable and commensurate to the wall of the building or with a deployment plan of insulating panels or exterior panel. The height 53 of each Z-shaped component 10, and in particular, the second wall 30, in the plurality of such Z-shaped components, may be uniform or variable from one component to the next to support an uneven surface design of exterior wall panels, or wall panels of varied thickness.

Figure 2:
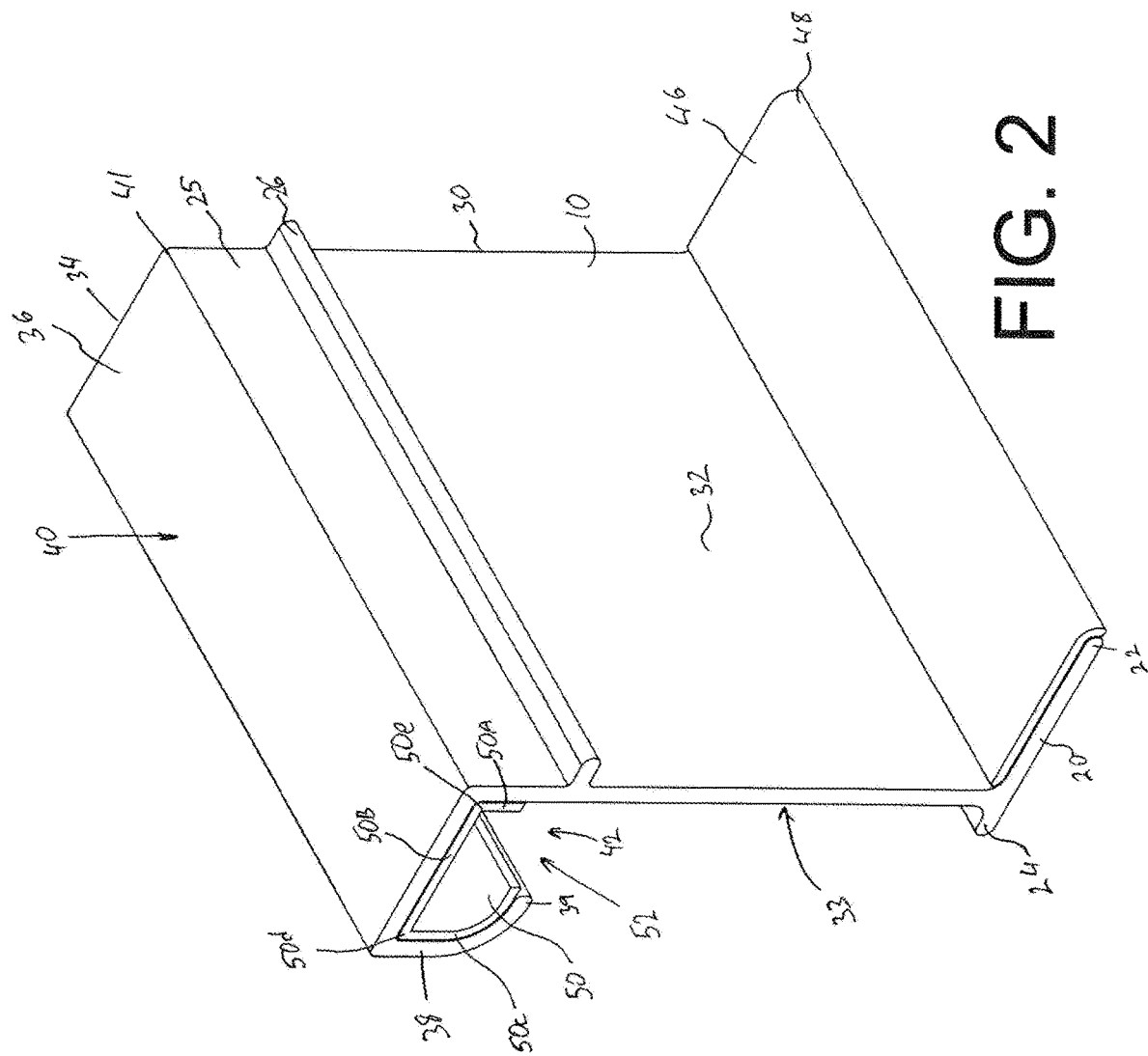
FIG. 2 is a perspective view of the preferred embodiment shown in FIG. 1.

FIG. 2 demonstrates a perspective top view of the Z-shaped component 10. Shown in figure is the first wall 20, the second wall 30, the J-shaped wall 34. The upper lip 26 juts out laterally from the first side 32, at an angle, preferably a right angle, to the second wall 30. The lip 24 is set off from free end 41 creating a gap 25. The height of the gap 25 may be equal to or different from the depth of the hollow channel 42.

A protective bracket 46 may be used to cover the surface of the first wall 20, The protective bracket 46 may additionally contain a flange 48 extending rearwardly. The flange 48 being adjacent to the first end 22. The protective bracket 46 accepts a fastener pierced therethrough and offers a stronger anchor location than the first wall 20. The first wall 20, as well as the overall Z-shaped component, are made from a polymeric composition which may be fibrous for strength.

Visible in FIG. 2 is the removable insert 50. The removable insert 50 is comprised of a first wall 50a. The first wall 50a is adjacent to the second wall 30. Extending laterally from the first wall 50a is a second wall 50b. The second wall 50b being adjacent to the first portion 36 of the J-shaped wall 34. Extending rearwardly from the second wall 50b is the third wall 50c. The third wall 50c being adjacent to the second portion 38 and having a shape conforming to the shape of the second portion 38. The corner 50e between the first and second walls 50a and 50b is adjacent to the angle formed by the second wall 30 and the J-shaped wall 34. The corner 50d is adjacent to the corner formed by the first portion 36 and second portion 38. The insert 50 may be introduced into the hollow channel 42 through the side openings 52 or through the gap between the free end 39 and the second side 33.

It should be appreciated that the insert 50 need not be shaped in the fashion demonstrated in FIG. 2 but can be shaped as a solid rod or cuboid. The insert 50 is intended additional strength to J-shaped wall 34 and serve as an anchor point for a fastener that carries the exterior wall paneling. The insert 50 need not be the same length as the hollow channel 42.

Figure 3A:
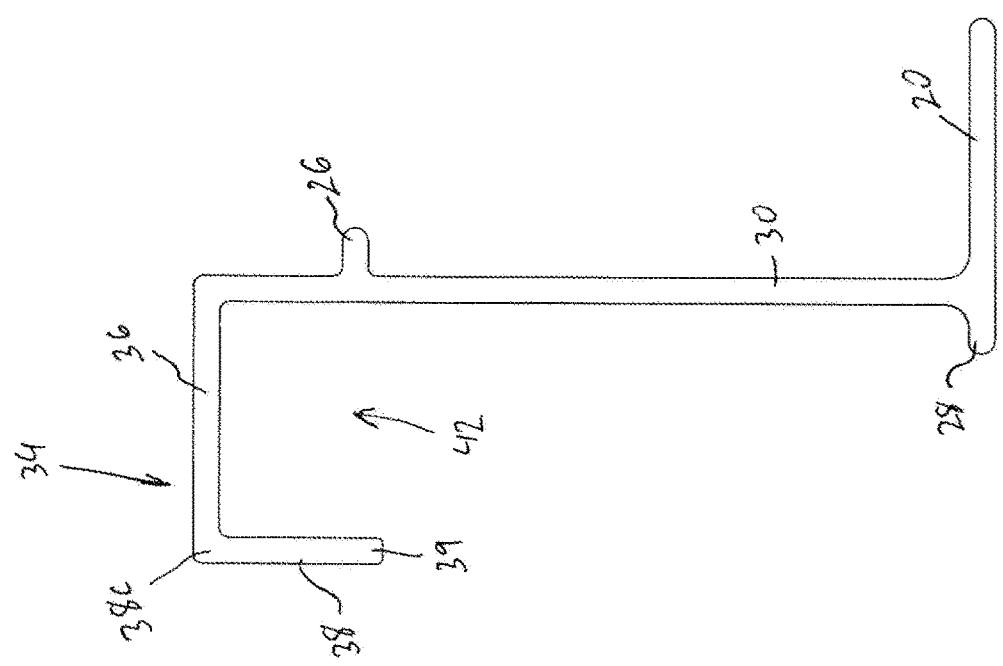
Figure 3D:
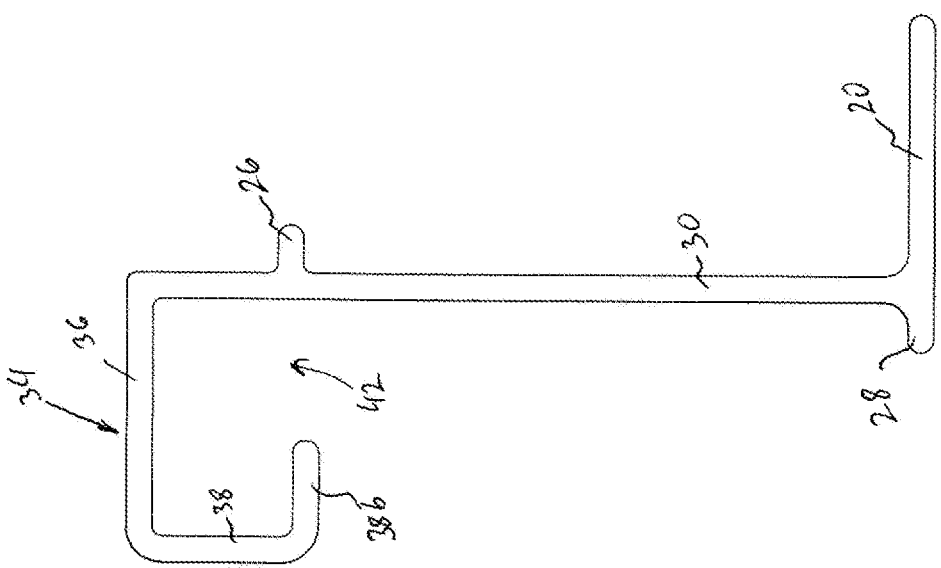
Figure 3E:
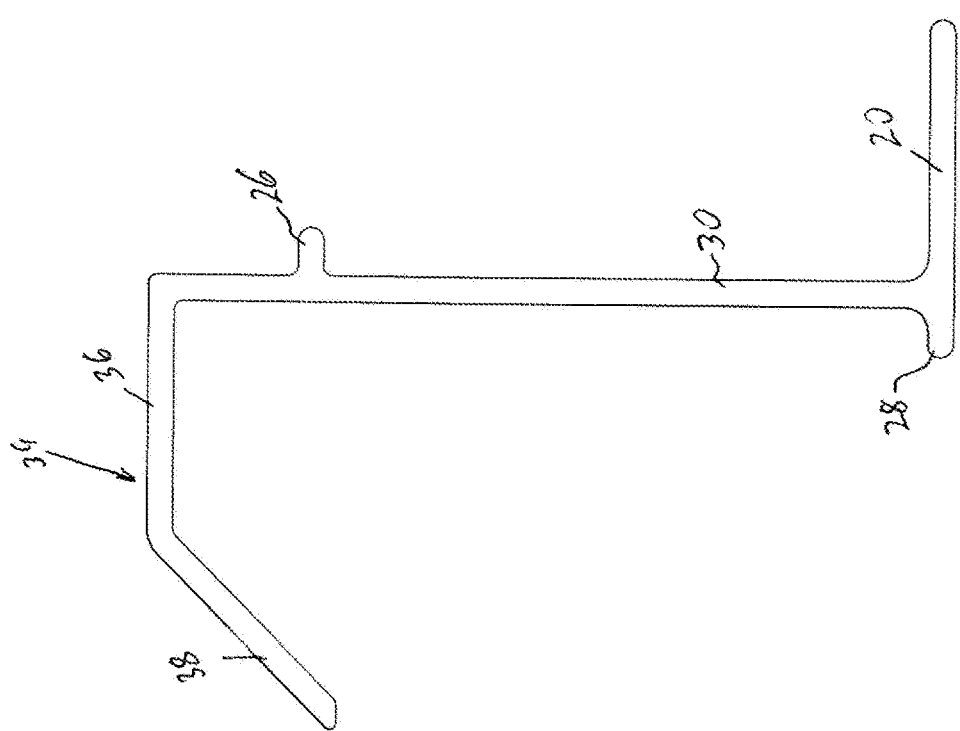
Figure 3F:
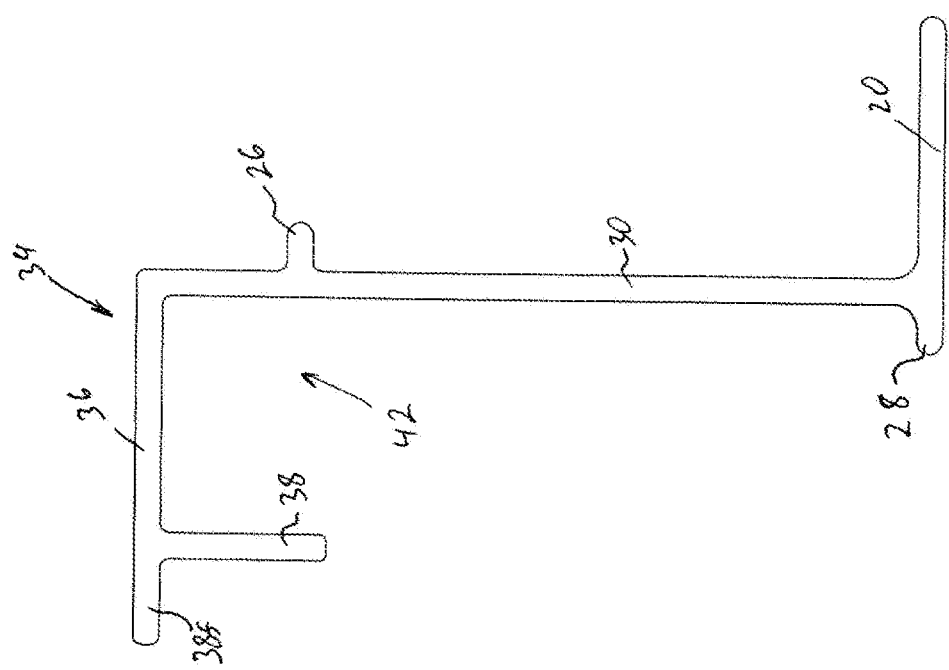

The J-wall 34 enforces the first moisture gap between an insulation panel and exterior decorative panel. It should be appreciated however, that the J-wall wall 34 need assume the shape of a "J" but may be executed in a plurality of other shapes. FIGS. 3A-3H demonstrate some of the alternative designs for the J-wall 34. The first portion 36 may be at a right angle with the second portion 38, with the second portion 38 not bending laterally towards the first side 33 but remaining substantially straight until the free end 39, as shown in FIG. 3A, or the free end may bend laterally for form a wall 38b that is coplanar with the lip 24 (FIG. 3d). Alternatively, the first portion 36 may meet the second portion 38 at an acute angle 38c (FIG. 3B) or an obtuse angle (FIG. 3e). The J-shaped wall 34 may assume a substantially trapezoidal shape (FIG. 3C), with the first wall 35 bending slightly laterally, and meeting the first portion 36 at an obtuse angle, with the first portion 36 connecting to the second portion at an obtuse angle and to wall 38b at an acute angle, with the wall 38b being co-planar with the upper lip 26. The second portion 38 may be extend rearwardly from the free end of the first portion 36 but set off at a distance from the free end, creating an overhanging extension 38f (FIG. 3F).

Figure 11:
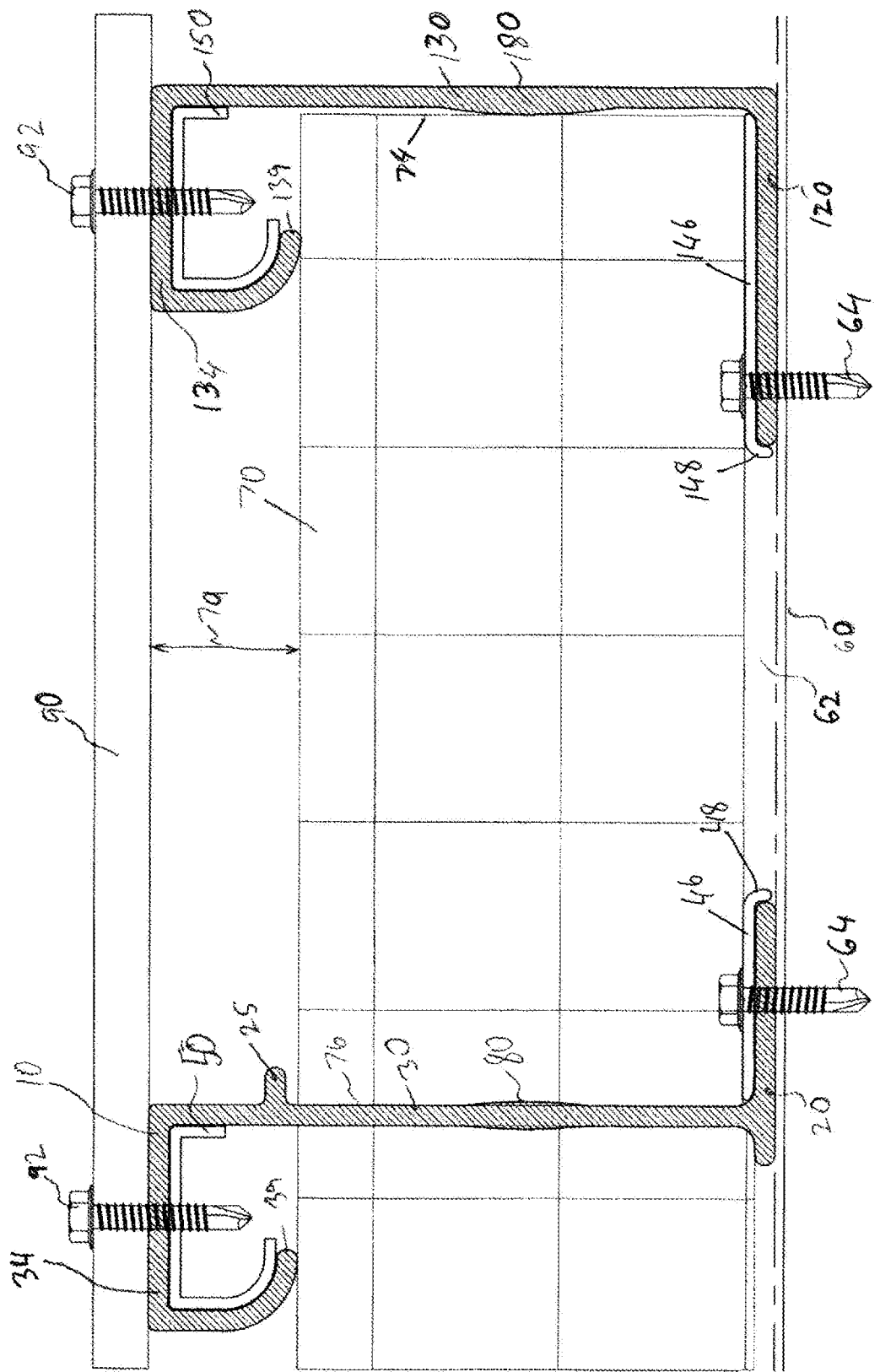
FIG. 11 showing the sideways views of the Z-shaped component and Edge component.

As shown in FIG. 3G, the second portion 38 may be replaced by the removable insert 50. The third wall 50c of the insert 50 fulfilling the function of the second portion 38. The free end 39, of the insert 50 now enforcing the thickness of the first moisture gap 79 (FIG. 11). The second wall 30 may be at an angle 25a to the first wall 20, that is more of an obtuse angle. The same obtuse angle 25b would then preferably be present at free end 41 of the second wall 30 if it is desirable that, the first portion 36 remain parallel to the plane of the first wall 20. The upper lip 26 would preferably remain parallel to the plane of the first wall 20, creating an acute angle 26a.

FIG. 4 demonstrates the Z-shaped component 10 mounted onto an existing wall 60 with a fastener 64. The fastener 64 is shown perforating the protective bracket 46 and the first wall 20. In this respect the protective bracket 46 functions as a washer and anchor point to ensure that the first wall 20 does not fracture under the strain of the fastener 64. The insert 50 and the protective bracket 46 permit the Z-shaped component to be manufactured out of polymers or other composite materials to minimize cost of manufacturing or weight of the overall construction, with insert 50 and the protective bracket 46 adding strength to the arrangement.

The first end 74 of each insulation panel 70 is adjacent to the second side 33 of the second wall 30 and the first end 76 is adjacent to the second side 32. Each insulation panel 70 is secured in place alone its top surface 72 by the lip 25 of one Z-shaped component 10 and the free end 39 of the next Z-shaped component 10. The space 79 then represents the first moisture gap.

The bottom surface 78 of each insulation panel 70 rests on the lip 24 of the first wall 20 of one Z-shaped component 10 and the first wall 20 of an adjacent Z-shaped component 10. The thickness of the first wall 20 creates the second moisture gap 62 between an existing wall 60 and each insulation panel 70.

Figure 5:
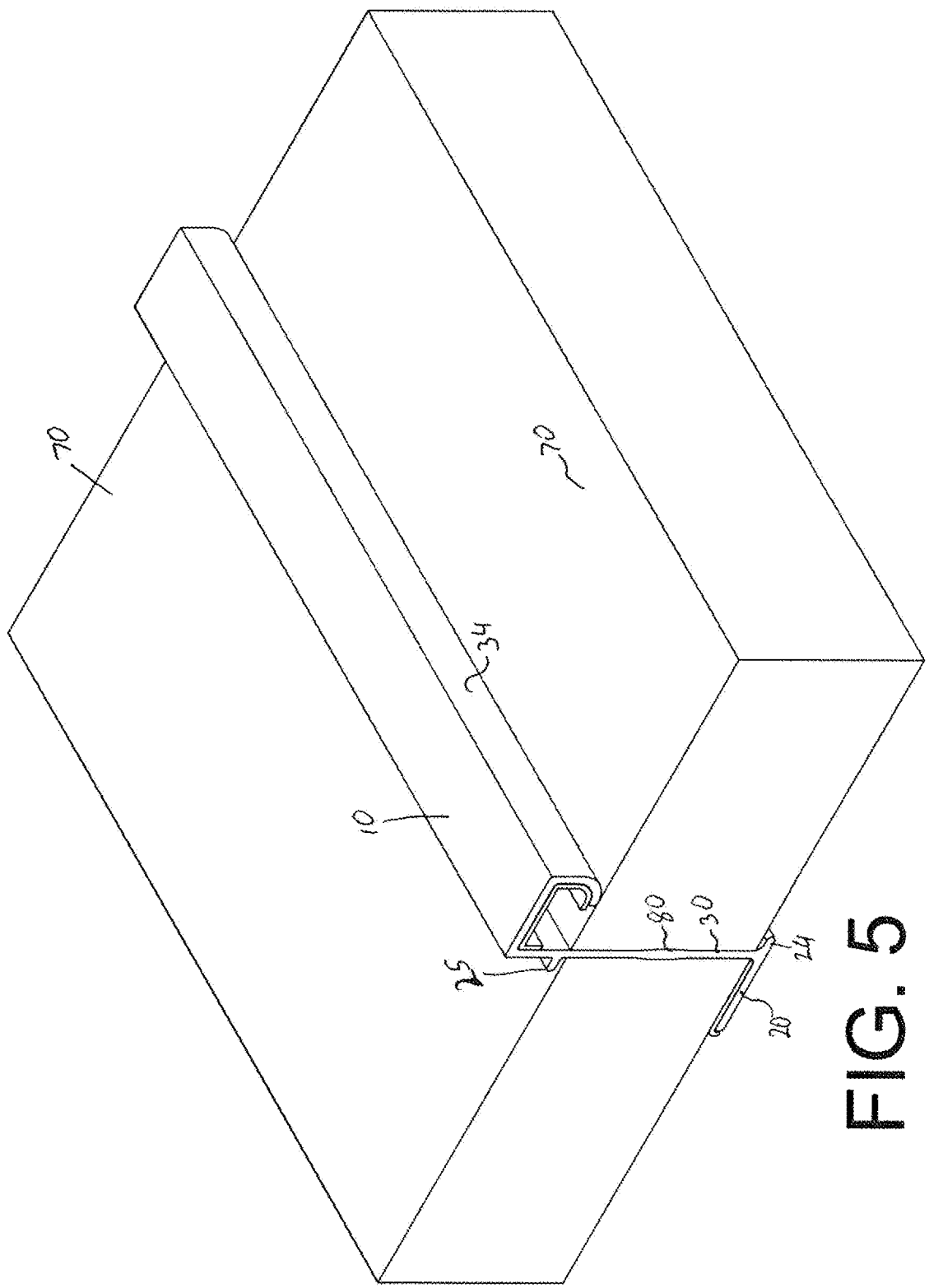
FIG. 5 is a perspective view of the Z-shaped component shown in FIG. 4, which also shows the concave section along the height of the second wall.
Figure 6:
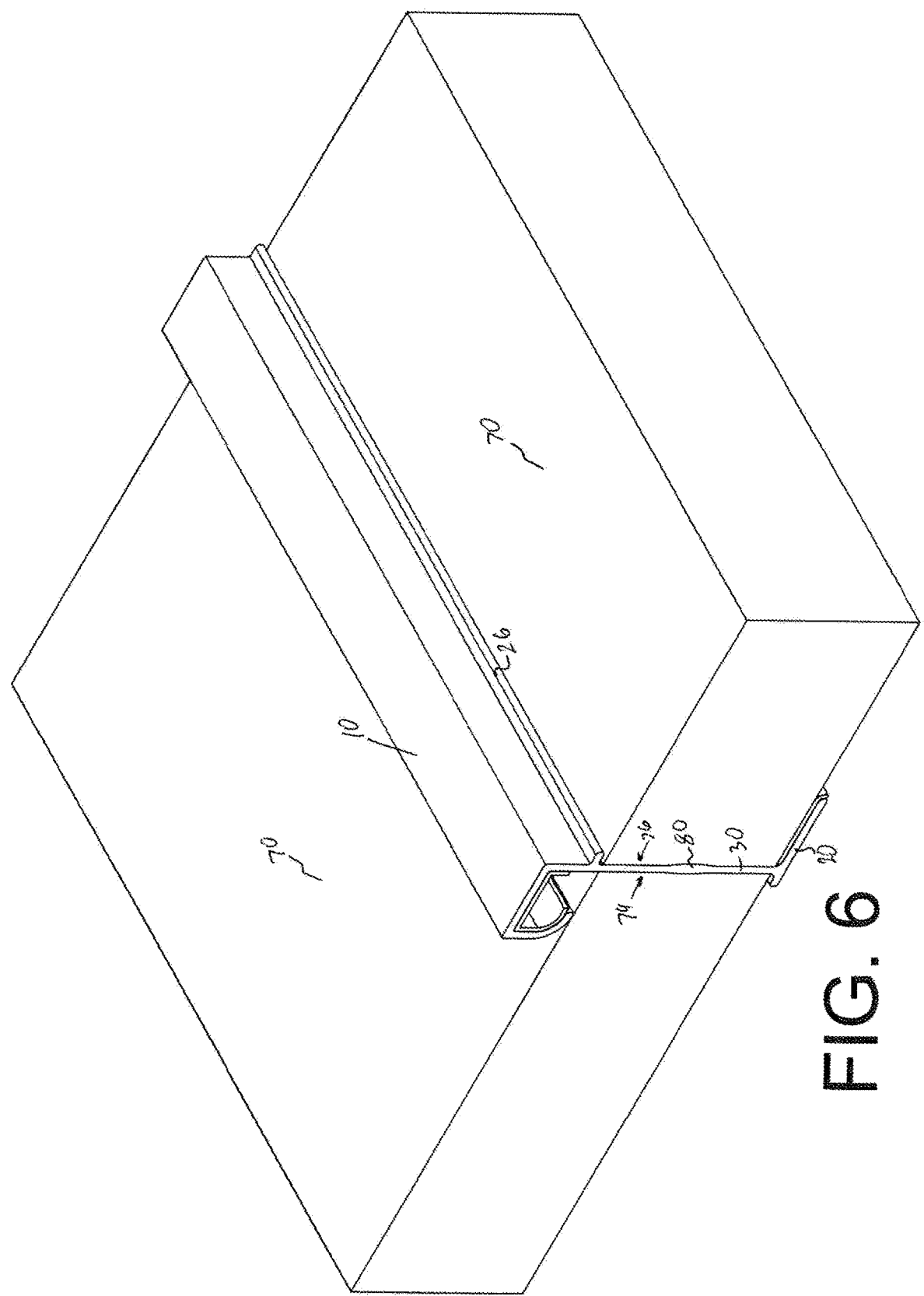
FIG. 6 is the perspective view showing the second side of the Z-shaped component shown in FIG. 5.

FIG. 5 demonstrates the general deployment of Z-shaped component 10 that is shown between two insulation panels 70, The insulation panels 70 are shown contained between the upper lip 26 and J-wall 34 and the lower lip 28 and first wall 20. FIGS. 5 and 6 demonstrate and embodiment featuring a concave section 80 along the height of the second wall 30. The concave section 80 may contain a flared section on at least one side of the second wall 30 and is intended to immobilize and seal the point of contact between the second wall 30 and the first and second ends 76 and 74 of the insulating panels 70.

Figure 7:
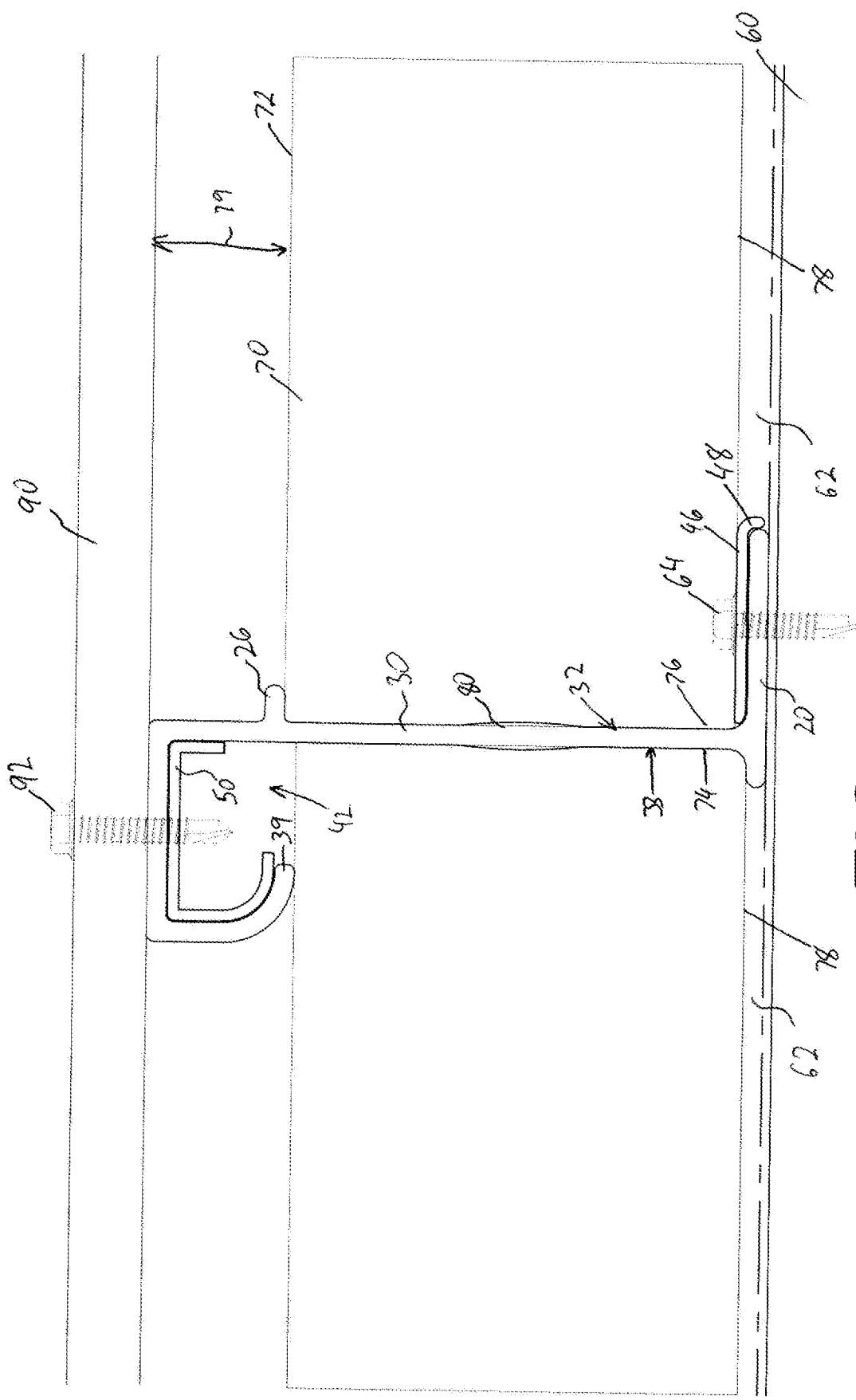
FIG. 7 is a sideways view of the Z-shaped component showing concave section and an external panel bolted to the outer surface of the first portion of the J-shaped wall.

FIG. 7 demonstrates the full deployment of one of a plurality of Z-shaped components 10. The first wall 20 is shown attached to the existing wall 60 with a fastener 64. Extending forwardly at an angle, preferably a right angle, from the first wall 20 is the second wall 30, The second wall 30 is in joined communication with first and second ends 76 and 74 of the insulating panels 70, which are further immobilized by the flared section 80. An upper lip 26 captures the top surface 72 of one of the insulation panels. The set off 25 of the upper lip 26 from the free end 41 of the second wall enforces along the first side 32 the required first moisture gap 79, otherwise known as thermal gap. The wall panel 90 representing an external or cladding paneling 90 is fastened to the outer surface 40 of the J-wall 34. The free end 39 of the J-wall 34 enforces the air or moisture gap 79 along the second side 33 of the Z-shaped component 10. The insert 50, if deployed within the hollow channel 42 and is also used as the anchor point for the fastener 92. The preferred thickness of the moisture gap 79 may be preferably between 1.5 and 2.5 centimeters.

Figure 8:
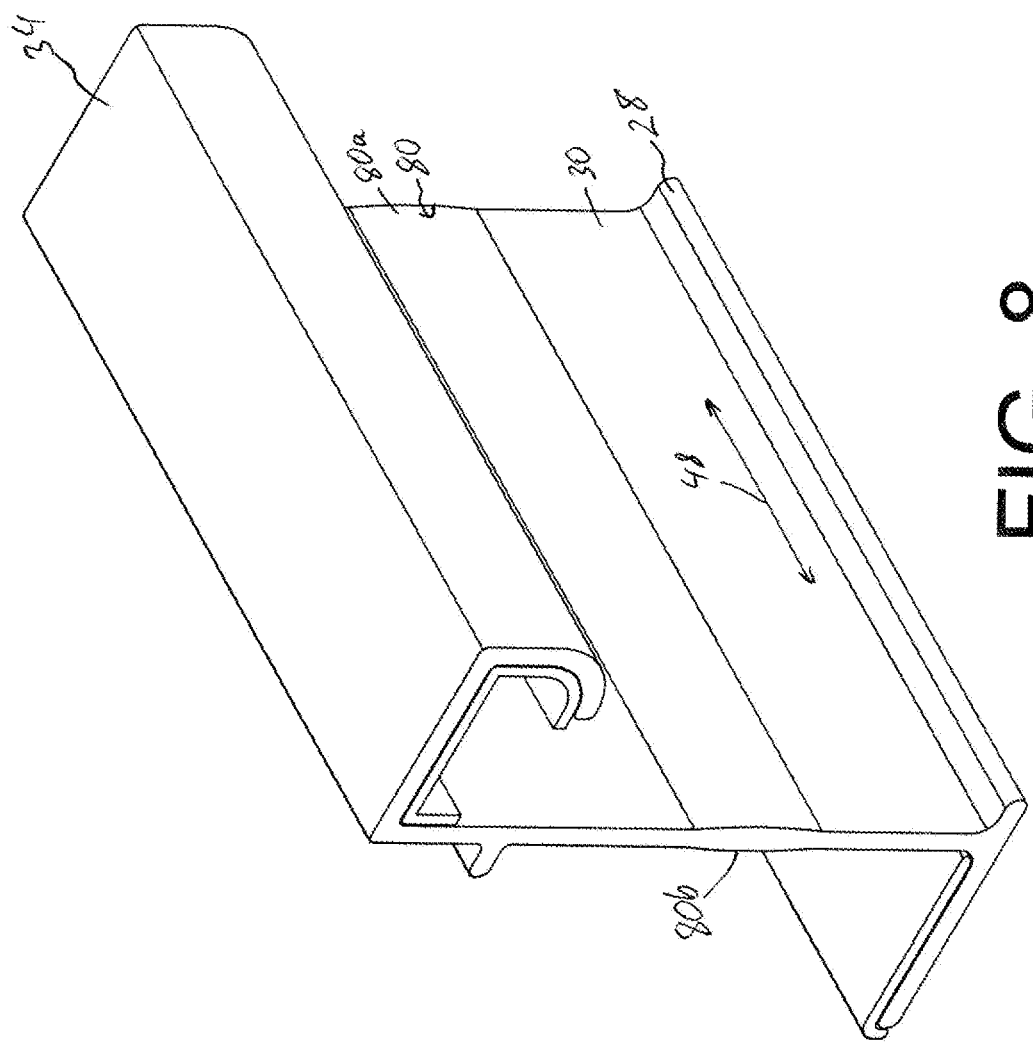
FIGS. 8 and 9 demonstrated the concave section along the height of the second wall.
Figure 9:
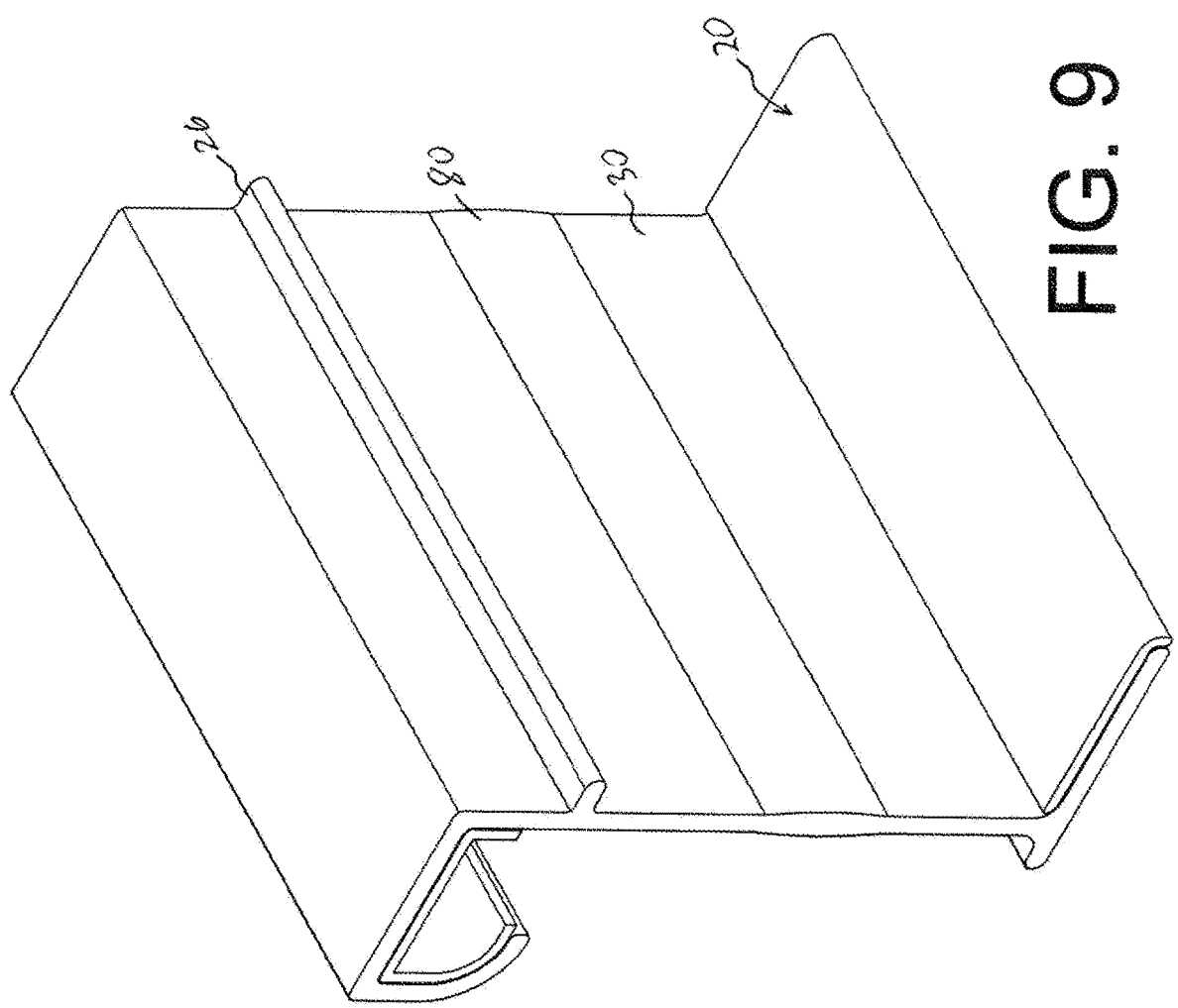

FIGS. 8 and 9 further demonstrate the flared section 80 shown here to be disposed along the entire length of the second wall 30 and on both sides thereof. Alternatively, the flared section 80 may be placed in one or several locations along the length 48 or on only one of the two sides of the second wall 30. There may be a flared section 80a and 80b on either side of the second wall 80 or just on one of the sides.

Figure 10:
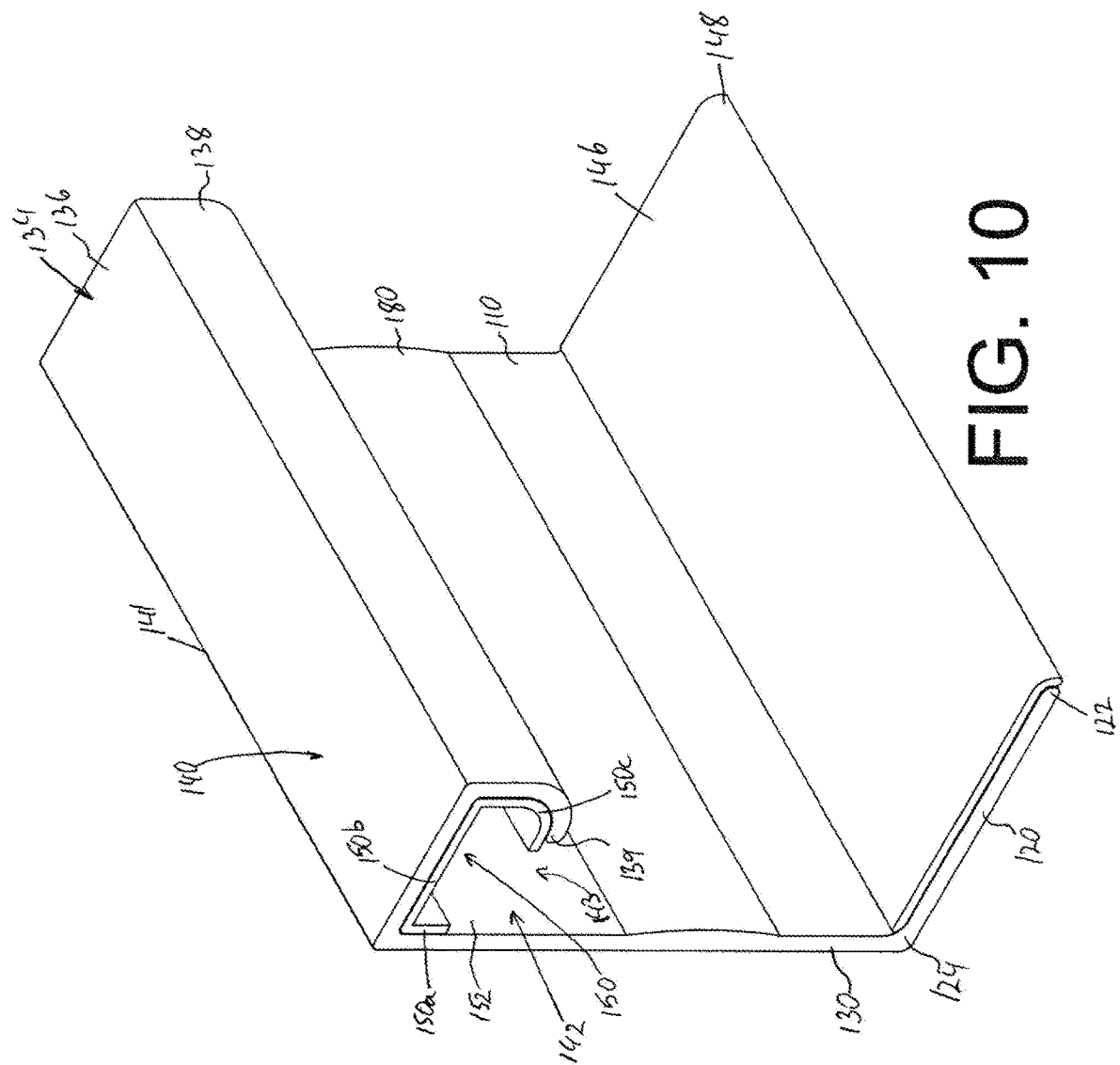

FIG. 10 demonstrates an edge component 110. Shown is the first wall 120, having a first end 122 and a second end 124. The first wall 120 being parallel with an existing wall 60 (FIG. 11) and being fastened thereon. Extending forwardly at an angle, preferably a right angle, from the free end, otherwise known as the second end 124, is the second wall 130. Extending from the free end 141 of the second wall 130 is the J-wall 134. The first portion of the J-wall 136 extends in the same direction, and in a parallel orientation as the first wall 120. The second portion 138 extends downward from the free end of the first portion 136, with the free end 139 bending toward the second wall 130 and stopping at a distance therefrom, thus creating a gap 143. The curvature of the J-wall 134 forming a hollow channel 142.

The insert 150 is preferably present and is removably inserted into the hollow channel 142 either through the side opening 132 or through the gap 143. The insert 150 having the first wall 150a, shown substantially as a stub wall adjacent to the second wall 130. Extending laterally at an angle, preferably a right angle, from the first wall 150a, is the second wall 150b that is adjacent with and parallel to the first portion 136. Extending downwardly from the free end of the second wall 150b is the third wall 150c, which in this embodiment is adopted to mirror the curvature of the second portion 138. It should be appreciated that the walls 150a-150c may be shaped differently and not be completely or actually adjacent to the outer walls forming the hollow channel 142. It should alto be appreciated that the insert 150 may be a solid rod or cuboid or extending part of the way within the length of the hollow channel 142. It should further be appreciated that FIGS. 3A-3E depicting various shapes of the J-wall 134 of the Z-shaped component 10 may be implemented with the Edge component 100 with equal effectiveness. The embodiment shown in FIG. 10 demonstrates the protective bracket 146, further having the flange 148.

FIG. 11 demonstrates the implementation of the edge component 110 along with the Z-component 10. The edge component 100 is deployed along an existing wall 60 in a parallel, spaced apart configuration with one of a plurality of the Z-shaped components 10. An insulation board is retained between the edge component 100 and the adjacent Z-shaped component 10. Where the first end 76 is adjacent to the second wall 30 and the second end 74 is adjacent to the second wall 130. The embodiment shown further comprises flared section 80 on the second wall 30 and the flared section 180 on the second wall 130. However, as shown in FIG. 10A, the second wall 130 need not include the flared section 180. Either or both the Z-shaped component 10 or the edge component 100 may be deployed with the second wall thereof not featuring a flared section.

It is preferred that the free end 39 of the Z-shaped component 10, the free end 139 of the Z-shaped component 100 and the upper lip of the Z-shaped component 10 are coplanar, to enforce a uniform, or minimum, moisture or thermal gap 79 between the top surface of the insulation panel and the exterior or cladding paneling 90. The exterior panel 90 is fastened to the J-wall 34 and the J-wall 134. The second moisture gap 42 is enforced by the first wall 20 and the first wall 120 of the Z-shaped component 10 and the edge component 100, respectively.

Figure 12:
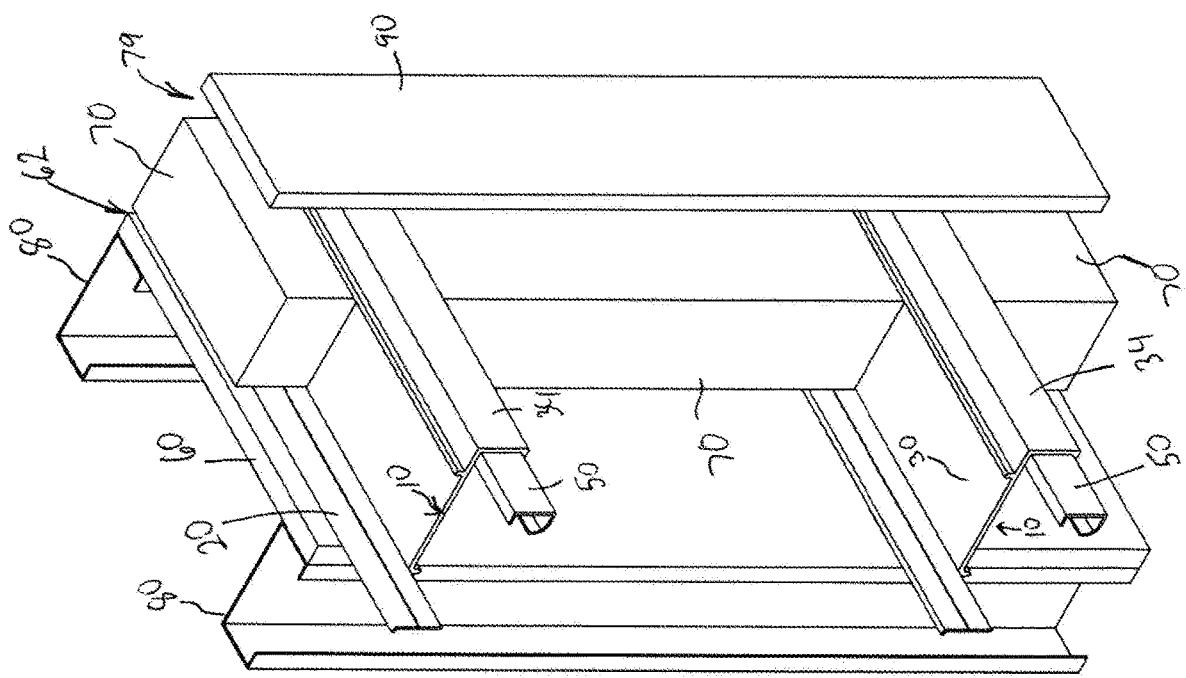
FIG. 12 is a view of a plurality of Z-shaped components with insulation panels installed therebetween.
Figure 38:
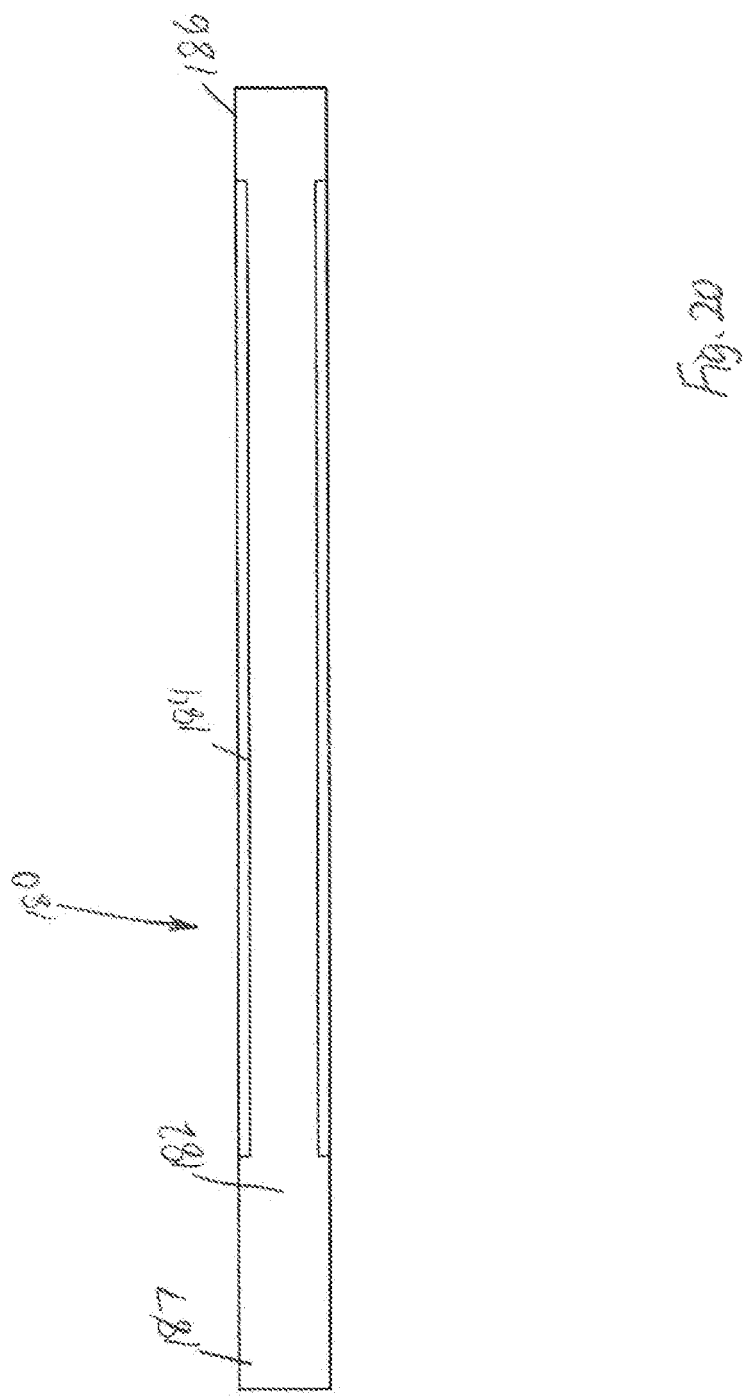

FIG. 12 demonstrates the plurality Z-shaped components 10, deployed in a parallel and spaced apart configuration along an existing wall 60. The plurality of insulation panels 70, with each panel retained within the space between two adjacent Z-shaped components 10, or adjacent Z-shaped component and an Edge component. A plurality of exterior wall panels 90 fastened to the J-walls 34 of the Z-shaped components 10 or/and the edge components. The J-wall 34 is shown creating the first moisture gap 79, and the first wall 20 is shown creating the second moisture gap 62.

FIG. 13 demonstrates an alternative embodiment of the system of securing insulation panels using the Z-shaped component 10. Each Z-shaped component 10 shown contains a plurality of elongated air slots 160. The elongated slots 160 are in a parallel and spaced apart relation to each other. At least one intersecting slot 162 intersects each of the elongated slots 160. The intersecting slot 160 is configured to admit the base wall 182 of the rod 180 inserted therethrough. The rod 180 spans the distance between two adjacent Z-shaped components 10 and is used to lock the insulation panel in place with respect to the wall 60 and the first moisture gap 79. One rod 180 may intersect two or more adjacent Z-shaped components in a series of adjacently placed Z-shaped components 10 or a separate rod 180 may span each distance between any two Z-shaped components 10.

The embodiment shown in FIG. 13 is demonstrated in FIG. 14 in greater detail. Shown is a Z-shaped component 10, having a first wall 20, a second wall 30 and a rearwardly extending wall 40a. The rearwardly extending wall 40a has been previously referred to as the J-shaped wall. The shape and structure of the rearwardly extending wall 40a may vary, as provided in previous drawings. Also shown in FIG. 14 is a plurality of elongated air gaps 160 disposed at intervals throughout the third wall 30. The elongated air gaps 160 are shown to be perpendicular to the axis of the first wall 20 but may be offset at an angle thereto. Each elongated air gap 160 having an A end 164 oriented proximally or near to the free end 38a of the second wall 30, and a B end 166, oriented proximally, or near, to the first wall 20. An intersecting slot 162 intersecting the elongated air gap 160 at a distance from the A end. As shown in FIG. 14, it is preferred that all intersecting slots 162 are located at the same level and parallel with each other. Additional intersecting slots may be made along the length of the elongated air gap 160 (not shown) to accommodate thinner insulation panels 70.

Still referring to FIG. 14, shown is the rod 180. The rod 180 preferably has at least one second wall 184 extending at angle, preferably a right angle, from the base wall 182. The first end 186 of the base wall 182 is inserted into one of the intersecting slots 162 and the second end 187 is inserted beneath the free end 41 of an adjacent Z-shaped component or continues through to the intersecting slot 162a of the adjacent Z-shaped component. The second wall 184 abuts the second wall 30 of one Z-shaped component 10 and the second portion 38 of the rearwardly extending wall 40a of the adjacent Z-shaped component 10 to maintain a certain degree of insertion of first and second points 186 and 187, respectively, with respect to the slots 162 and 162a. Appreciably there may be a separate rod inserted into each intersecting slot 160 and a corresponding slot 162a. Or there may be fewer rods 180 than the number of elongated slots 160.

FIGS. 15 and 16 demonstrate how the width of the gap 79 can be regulated using the rod 180. In FIG. 14, the second wall 184 was shown pointing away from the top surface 72, therefore, the first air gap 79 was the distance between the free end 41 and the wall panel 90 (FIG. 11). In FIGS. 15 and 16, the second wall 184 is pointing toward the top surface 72 of the insulation panel 70. Thus, the first air gap 79 has increased to account for the width of the wall 184.

FIGS. 17 and 18 demonstrate the alternative embodiments of the Z-shaped component featuring a plurality of parallel elongated air gaps 160. The function of the air 160 is to permit a constant flow of air flowing through the Z-shaped components. This air flow provides the necessary ventilation to keep insulation panels 70 dry and free of mold and other harmful buildup that would otherwise result from ever-present moisture. Working together and in concert with the elongated air gaps 160 is a plurality of air openings 190 made through the second portion 38 of the J-shaped wall 40. The air openings 190 are designed to let air through even though the rest of the length of the second wall 30 may be blocked due to the presence of the insulation panel 70. The air openings 190 are preferably co-axial to or being in line and parallel with the elongated air gaps 160 but may be offset in other embodiments.

FIGS. 19 and 20 demonstrate the rod 180. Shown is the base wall 182, at least one second wall 184, a first end 186 and a second end 187. The width 185 of the second wall 184 may vary based on preference, the thickness of the insulation panel used or the air gap desired, with the greater width 185 resulting in a greater air gap if the second wall 184 is pointed toward the top surface 72 of a panel 70. The shape of the second wall 184 may be rounded. The second walls 184 is shown to extend perpendicularly from free sides of the base wall 182. Alternatively, the angle of the second wall 184 with respect to the base wall 182 may be different and the second wall 184 may be disposed towards the middle of the base wall 182, or not be presented as a solid wall, but a series of protrusions.

FIG. 20A demonstrates the edge component having a slightly different embodiment than shown in prior figures. Shown is the edge component 110 having a first wall 120, a second wall 130 and a forwardly extending wall 140a. The forwardly extending wall 140a is comprised of a first portion 136, which originates from at an angle, preferably a right angle, from a free end 141 of the second wall 130. The first portion is parallel to and spaced apart from the first wall 120. The second portion 138 extends downward and toward the first wall 120 and is in a parallel spaced apart arrangement with the second wall 130. The free end 139 is the most distal end of the second portion 138 and, preferably is coaxial (or on the same level) as a free end 39 of a Z-shaped component 10 that is mounted adjacently to the edge component 110.

There is a plurality of elongated air gaps 160 shown running across the second wall 130, with the A end 164 being adjacently located to the forwardly extending wall 140a and the B end being adjacently located to the first wall 120. At least one intersecting slot 162 intersects each one of the elongated air gaps 160 preferably perpendicularly. There may be additional intersecting slots 162 on each of the air gaps 160. FIG. 21 shows a plurality of air openings 190 along the second portion 138 above the free end 139.

Figure 22:
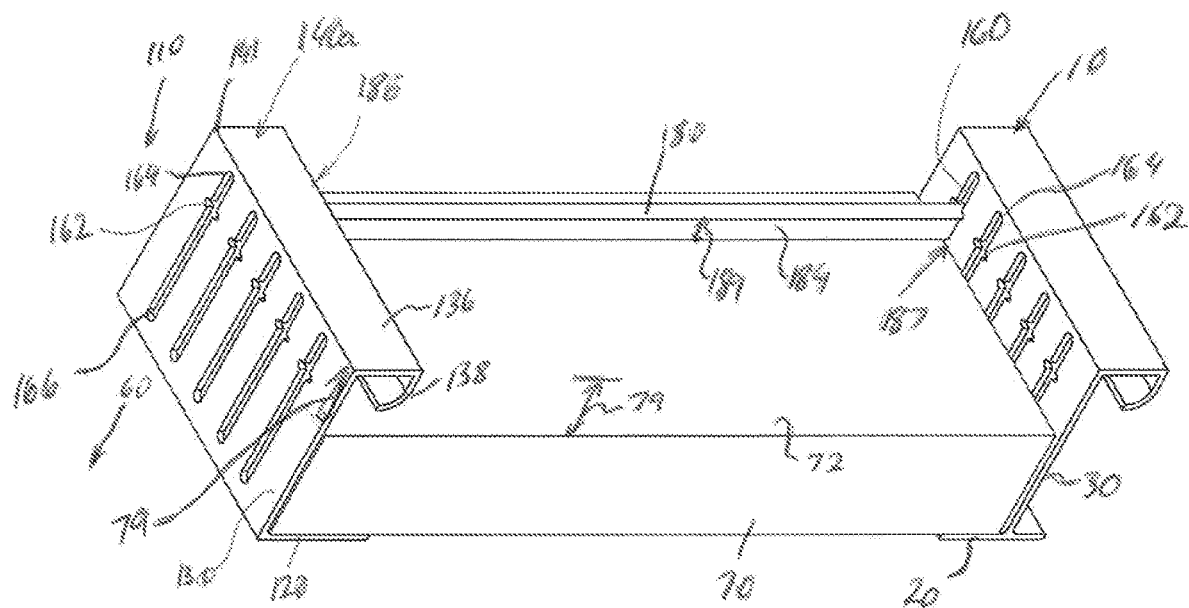
FIG. 22 is another diagram of a rod for retaining insulation panels between two adjacent Z-shaped components.
Figure 23:
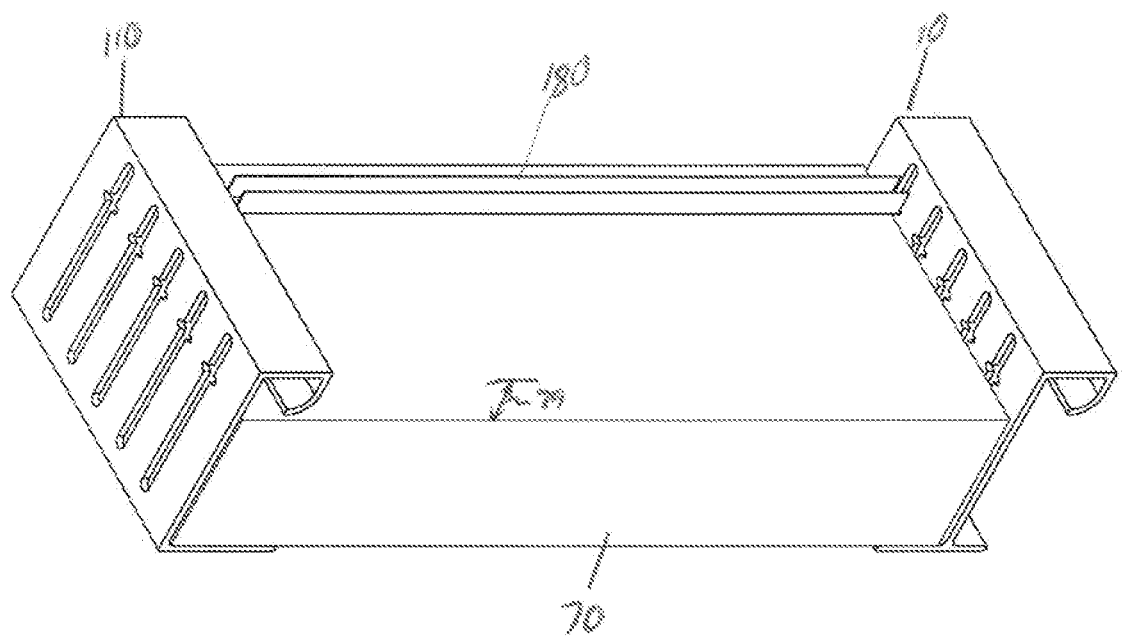
FIG. 23 demonstrates a combination of the Z-shaped component together with an edge component as shown in FIG. 13.

FIGS. 22 and 23 demonstrate how the edge component 110 works in concert with a Z-shaped component 10. The edge component 110 is deployed along an edge of an existing wall 60 or at an end of a section of wall cladding, where one section of a wall cladding 90 (FIG. 12) must be interrupted.

As shown in FIG. 22. The first end 186 of the rod 180 is mounted within one of the intersecting slots 162 of the edge component 110 and the second 187 is mounted in the intersecting slot 162 of the nearest adjacent Z-shaped component 10. The width 189 and the orientation of the second wall 184 of the rod 180 determines the width of the air gap 79. Thus in FIG. 22, the second wall is pointing towards and abuts against the top surface 72 of the insulation panel 70. This configuration is required to widen the air gap 79, or when using a thinner insulation panel 70. If the rod 180 is used to secure a section of the insulation panel 70 a configuration shown in FIG. 23 is utilized. Here the second wall 184 of the rod 180 points away from the top surface 180 and the thickness of the air gap 79 is counted from the free end 39 or 139 of the Z-shaped component 10 or the edge component 110, respectively, or from the desired level of intersecting slots 162. While the air gaps 160 are shown to be elongated, these may be formed in any shape, such as plurality of round openings, or more elliptical openings, or gaps that run across the second wall 30 or 130, and in parallel with the second wall 20 or 120.

Figure 24:
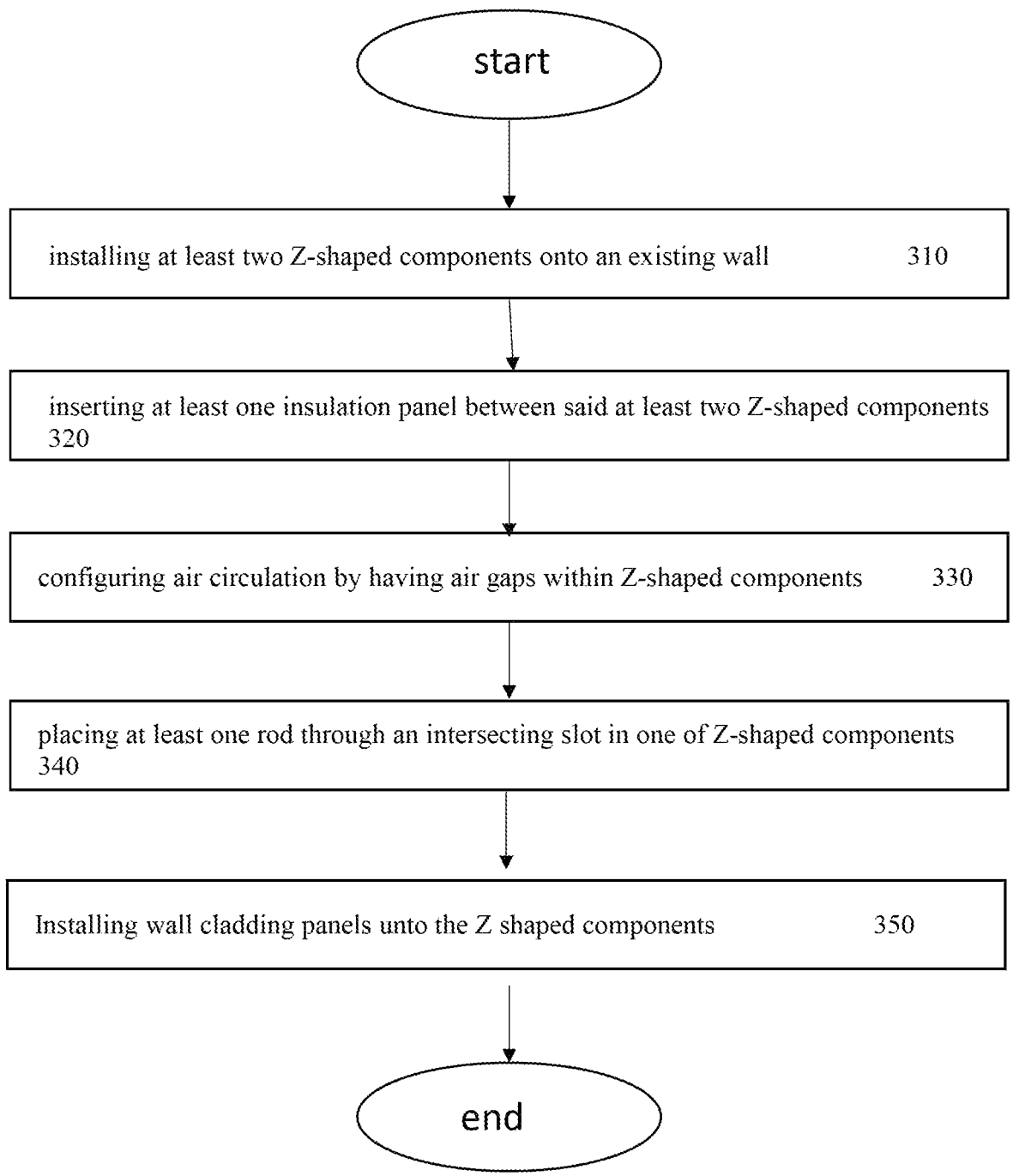
FIGS. 24 and 25 demonstrate the method of insulating and placing wall cladding on an existing wall utilizing the Z-shaped components and the edge components shown in present invention.
Figure 25:
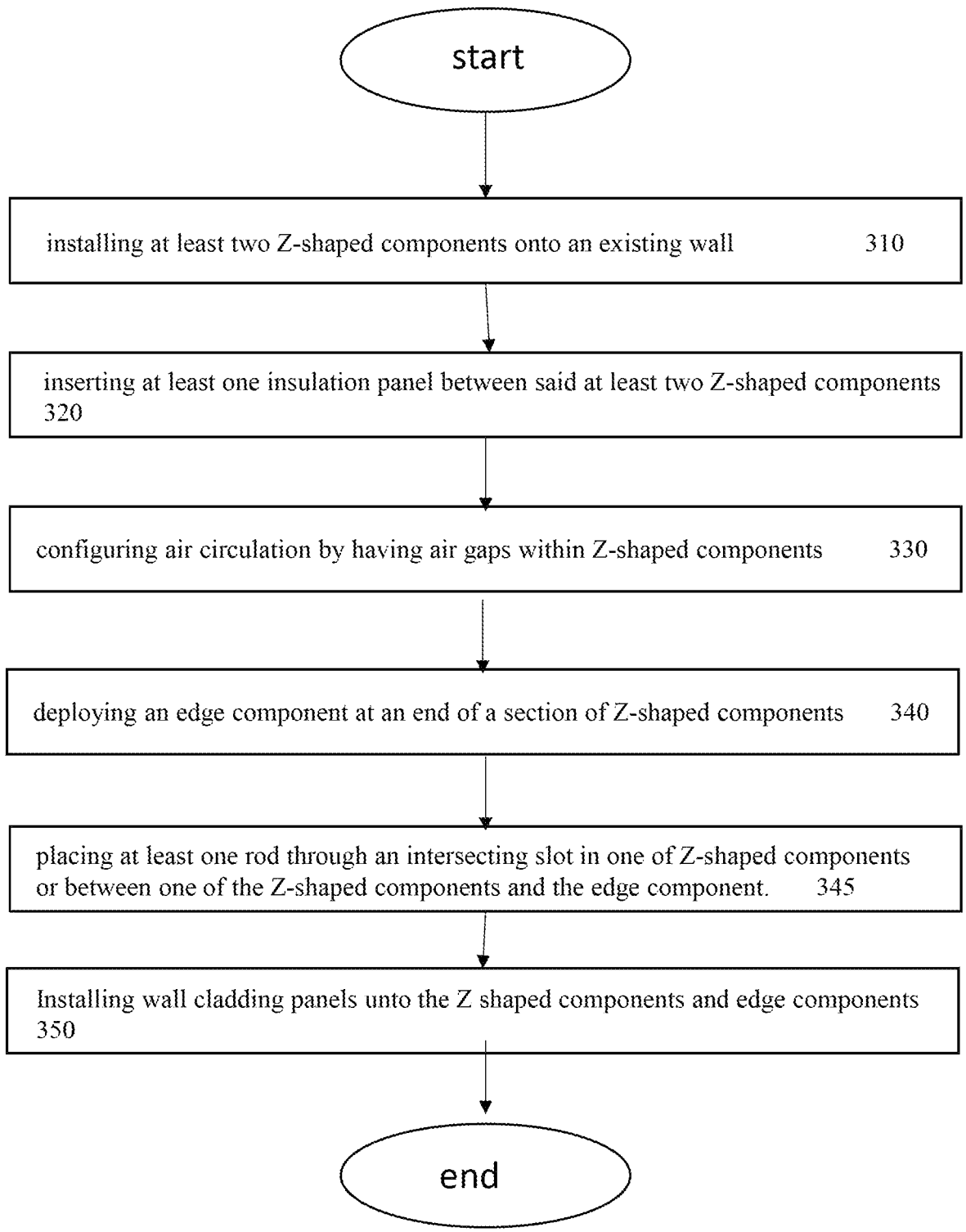

FIGS. 24 and 25 demonstrate the method of installing wall cladding over an existing wall. The method is preferably utilized along an exterior façade of a building but may be utilized for the interior as well. Shown in FIGS. 24 and 25 are steps of mounting insulation panels unto an existing wall comprising the step of installing at least two Z-shaped components onto an existing wall 310. Followed by the step of inserting at least one insulation panel between the Z-shaped components 320. Steps 310 and 320, result locking the mounted insulation panel into place between a second walls of adjacent Z-shaped components, whether two components or a series of Z-shaped components. Steps 310 and 320 work in concert with the step 330 of configuring air circulation by having air gaps within Z-shaped components. Finally, the method ends with the step 350, installing wall panels onto the Z-shaped components.

The disclosed method further augmented with the step 340 of placing at least one rod through an intersecting slot in one of Z-shaped components, where the rod spans the distance between the two adjacent Z-shaped components or a series of adjacently placed Z-shaped components. The disclosed method is further augmented with step 345 of deploying an edge component at an end of a section of Z-shaped components, this causes the step 350 to include a step of installing wall panels over the edge components.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A system of securing insulation between an existing wall and exterior wall panels comprising:
    a plurality of Z-shaped components;
    each of said plurality of said z-shaped components having a first wall, said first wall having a first end and a second end, said first wall being parallel to and mounting on an existing wall;
    a second wall extending outwardly at an angle from said second end, said second wall having first side and a second side;
    wherein said second wall further comprising a plurality of elongated air slots;
    wherein said elongated air slots being in a parallel spaced apart orientation with each other; wherein said elongated air slots further comprising mount points for a holding element;
    a rearwardly extending wall, said rearwardly extending wall extending from a free end of said second wall, wherein said rearwardly extending wall facing in an opposite direction from said first wall
    wherein said rearwardly extending wall further comprising a first portion, said first portion being in a parallel orientation with said first wall, a first portion configured to have a wall panel fastened thereto;
    a second portion extending rearwardly from said first portion in a spaced apart relation to said second wall;
    said Z-shaped component configured to retain at least one of a plurality of insulation panels, each one of said plurality of insulation panels configured to be mounted between two of said plurality of Z-shaped components; wherein a bottom surface of each of said plurality of insulation panels configured to be adjacent to said first wall and a top surface of each of said plurality of insulation panels configured to be adjacent to the free end of said rearwardly extending wall; and wherein a first end of each of said plurality of insulation panels configured to be adjacent to said second side of a first of said two of said plurality of Z-shaped components and wherein the second end of each of said insulation panels configured to be adjacent to said first side of a second of said two of said plurality of Z-shaped components.

2. The system of securing insulation between an existing wall and exterior wall panels of claim 1, wherein each of said plurality of elongated air slots having an A end oriented proximately to a free end of said second wall; and wherein a B end of each of said plurality of elongated air slots oriented proximately to said first wall.

3. The system of securing insulation between an existing wall and exterior wall panels of claim 2, wherein each of said plurality of air slots oriented perpendicular to said first wall.

4. The system of securing insulation between an existing wall and exterior wall panels of claim 2, wherein each of said mount points further comprising at least one intersecting slot; wherein said at least one intersecting slot being at a predetermined distance from said A end; and wherein said predetermined distance of said at least one slot being equal for each one of said elongated air slots.

5. The system of securing insulation between an existing wall and exterior wall panels of claim 4, wherein said holding element is at least one rod said at least one rod having a base wall; said base wall having a first end and a second end; wherein said first end configured to be inserted into one of said at least one intersecting slot of one of said Z-shaped components and wherein said second end of said at least one rod configured to be inserted into one of said intersecting slot of an adjacent Z-shaped component; and wherein said at least one rod is configured to lock at least one of said plurality of insulation panels in place between two adjacent Z-shaped components; and wherein said rod is configured to regulate a width of a first air gap formed between said wall panel and one of said plurality of insulation panels.

6. The system of securing insulation between an existing wall and exterior wall panels of claim 5, wherein said at least one rod is capable of being inserted through a plurality of said at least one intersecting slots of a series Z-shaped components; wherein said series having two or more Z-shaped components being adjacent to each other.

7. The system of securing insulation between an existing wall and exterior wall panels of claim 2, further comprising a plurality of air openings; wherein each of said plurality of air openings being in a coaxial orientation with said elongated air slots.

8. The system of securing insulation between an existing wall and exterior wall panels of claim 5, wherein said at least one rod having at least one second wall extending at an angle to said base wall.

9. The system of securing insulation between an existing wall and exterior wall panels of claim 8, wherein said at least one second wall configured to control the distance between said top surface of said one of said plurality of insulation panels and said free end.

10. The system of securing insulation between an existing wall and exterior wall panels of claim 5, further comprising an edge component, said edge component being in a spaced apart parallel relation to at least one of said plurality of said Z-shaped components; wherein said edge component having a first wall, said first wall being parallel with an existing wall and configured to be fastened thereto; a second wall extending at an angle from a free end of said first wall of the edge component, said second wall of the edge component having first side and a second side; a forward extending wall extending from a free end of said second wall of the edge component, said forward extending wall further comprising a first portion extending from a free end of said second wall of said edge component; a second portion of said forward extending wall of the edge component extending downwardly from said first portion in a spaced apart relation to said second wall of the edge component; wherein an outer surface of said first portion of the edge component configured to have a wall panel fastened thereto;

wherein a free end of said second portion of the edge component being co-planar with the free end of the rewardly extending wall of one of the plurality of Z-shaped components that is adjacent to said edge component; and wherein one of said plurality of said insulation panels configured to fit in a space between said edge component and one of said Z-shaped components that is adjacent to said edge component.

11. The system of securing insulation between an existing wall and exterior wall panels of claim 10, wherein said second wall of said edge component further comprising a plurality of air slots; wherein said air slots being in a parallel spaced apart orientation with each other; wherein each of said plurality of air slots having an A end oriented proximately to a free end of said second wall; and wherein a B end of each of said plurality of air slots oriented proximately to said first wall; each of said plurality of parallel air slots further comprising mount points; wherein said mount points being at a predetermined distance from said A end; and wherein said predetermined distance of said at least one slot being equal for each one of said elongated air slots; and wherein a second end of said rod configured to be inserted beneath said free end of the second portion of the edge component or one of mount points of the edge components and wherein the second end of said rod configured to be inserted through one of said one of said mount points of the Z-shaped component, such that said rod locks into place one of a plurality of insulation panels, wherein said one of said plurality of insulation panels is configured to be inserted between said Z-shaped components and said edge components; wherein said one of said Z-shaped components and said edge component are in an adjacent and spaced apart relation to each other.

12. The system of securing insulation between an existing wall and exterior wall panels of claim 11, wherein the second portion of said edge component further comprising a plurality of air openings.

13. A Z-shaped component comprising; a first wall, said first wall having a first end and a second end, said first wall being parallel to and mounting on an existing wall;

a second wall extending outwardly at an angle from said second end, said second wall having first side and a second side;

wherein said second wall further comprising a plurality of air slots; said plurality of elongated air slots having mount points for at least one holding element, each one of said at least one holding element configured to secure an insulating material;

a J-shaped wall, said J-shaped wall extending from a free end of said second wall, wherein said J-shaped wall facing in an opposite direction from said first wall;

wherein said J-shaped wall further comprising a first portion, said first portion being in a parallel orientation with said first wall, a first portion configured to have a wall panel fastened thereto;

and a second portion extending rearwardly from said first portion in a spaced apart relation to said second wall.

14. The Z-shaped component of claim 13, wherein said air slots being in a parallel spaced apart orientation with each other; wherein each of said plurality of air slots having an A end oriented proximately to a free end of said second wall; and wherein a B end of each of said plurality of air slots oriented proximately to said first wall.

15. The Z-shaped component of claim 14, wherein each of said of air slots oriented perpendicular to said first wall.

16. The Z-shaped component of claim 14, wherein each of said mount points further comprising at least one intersecting slot; wherein said at least one intersecting slot being at a predetermined distance from said A end; and wherein said predetermined distance of said at least one slot being equal for each one of said elongated air slots; and wherein said at least one slot configured to receive a rod inserted therethrough.

17. The system of securing insulation between an existing wall and exterior wall panels of claim 16, further comprising a plurality of air openings; wherein each of said plurality of air openings being in a coaxial orientation with said elongated air slots.

18. A method of mounting insulation panels unto an existing wall comprising the steps of, installing at least two Z-shaped components onto an existing wall; wherein each of said at least two Z-shaped components is comprised of a first wall, a second wall extending forwardly from said first wall and a rearwardly extending wall extending from a free end of said second wall; wherein said second wall further comprising a plurality of elongated air slots, said elongated air slots being in a spaced apart orientation with each other; wherein each of said elongated air slots in a plurality of elongated slots having a mount point, each of said mount points configured to hold a holding element; wherein a length of elongated air slot extends between said mount point and an A of said second wall;

said at least two Z-shaped components being in a spaced apart configuration with each other; inserting at least one insulation panel between said at least two Z-shaped components, wherein said at least one insulation panel being held in place between a second wall of said one of the at least two Z-shaped components and beneath the rearwardly extending wall of another of said at least two Z-shaped components;

attaching wall panels onto said rearwardly extending wall of said at least two Z-shaped components, wherein said step of attaching said wall panels onto said rearwardly extending wall creating an air gap between said at least one insulation panel and said wall panels; and wherein said gap ensuring unobstructed air circulation and moisture drainage flowing through said plurality of elongated air slots of said at least two Z-shaped components.

19. The method of mounting insulation panels of claim 18, further comprising the step of placing at least one rod through said mount point in one of Z-shaped components, wherein said rod spans the distance between said at least two Z-shaped components.

20. The method of mounting insulation panels of claim 19, further comprising a step of deploying an edge component at an end of a section of Z-shaped components; and wherein the step of installing wall panels further comprises a step of installing wall panels over the edge components.

* * * * *